United States Patent [19]

Ogiya et al.

[11] Patent Number: 4,968,479
[45] Date of Patent: Nov. 6, 1990

[54] FUEL ASSEMBLY FOR NUCLEAR REACTOR

[75] Inventors: Shunsuke Ogiya; Mamoru Nagano, both of Yokohama; Kouji Hiraiwa, Zushi; Hisao Suzuki, Kawasaki; Shouichi Watanabe, Ibaraki; Makoto Ueda, Yokohama, all of Japan

[73] Assignee: Kabushiki Kaisha Toshiba, Kawasaki, Japan

[21] Appl. No.: 235,629

[22] Filed: Aug. 24, 1988

[30] Foreign Application Priority Data

Aug. 27, 1987 [JP] Japan .................................. 62-211258
Jun. 14, 1988 [JP] Japan .................................. 63-144705
Jun. 27, 1988 [JP] Japan .................................. 63-156658

[51] Int. Cl.$^5$ ............................................. G21C 3/30
[52] U.S. Cl. ..................................... 376/428; 376/419
[58] Field of Search ................. 376/419, 423, 428, 447

[56] References Cited

U.S. PATENT DOCUMENTS 4,280,874 7/1981 Kawai ................................... 376/428
4,683,113 7/1987 Mochida ............................... 376/419
4,777,016 10/1988 Yoshioka ............................. 376/444

Primary Examiner—Donald P. Walsh
Attorney, Agent, or Firm—Foley & Lardner, Schwartz, Jeffery, Schwaab, Mack, Blumenthal & Evans

[57] ABSTRACT

A fuel assembly for a nuclear reactor includes a number of fuel rods filled with a fuel material. A water rod having a cross sectional area larger than that of each fuel rod is disposed at substantially the central portion of the fuel assembly. The fuel rods include first fuel rods having a whole effective fuel zone filled with a fuel material throughout the entire length thereof and second fuel rods each having an interposed zone in which enrichment of a fissile nuclide is significantly reduced or the fissile nuclide does not exist at all. The second fuel rods are arranged so as to surround the water rod so that the interposed zones are positioned on an axial level including a portion at which subcriticality is made small at a period in which maintenance of reactor shut-down margine is made difficult during the reactor operation period. The water rod may be provided with a lower portion having a cross sectional area smaller than that of an upper portion and short fuel rods are disposed so as to surround the lower portion of the water rod.

16 Claims, 25 Drawing Sheets

LOCAL POWER PEAK AT OCCURRENCE OF
MAXIMUM LINEAR HEAT RATING

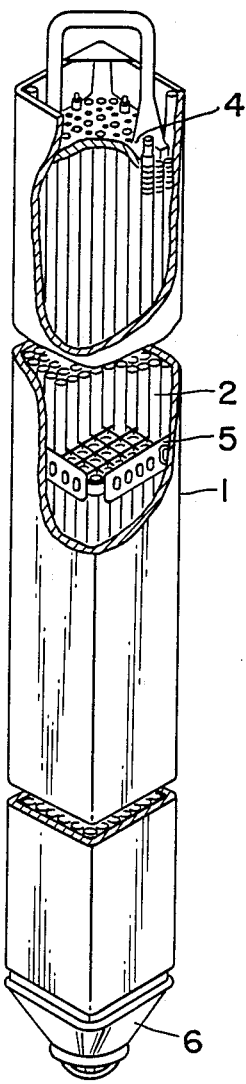
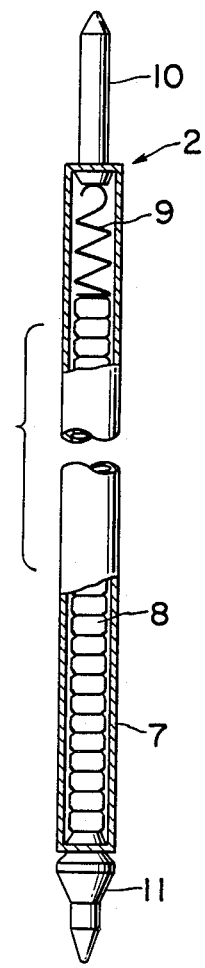
FIG. 31A
PRIOR ART
FIG. 31B
PRIOR ART

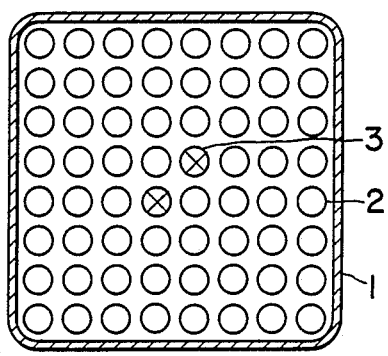
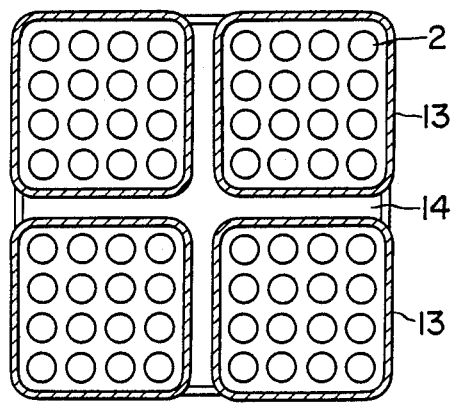
FIG. 32
PRIOR ART
FIG. 34
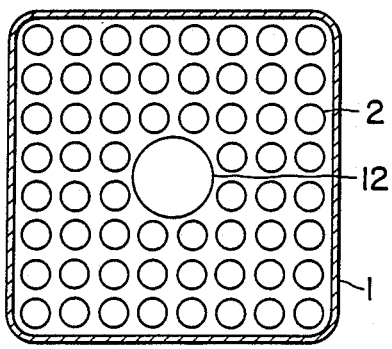
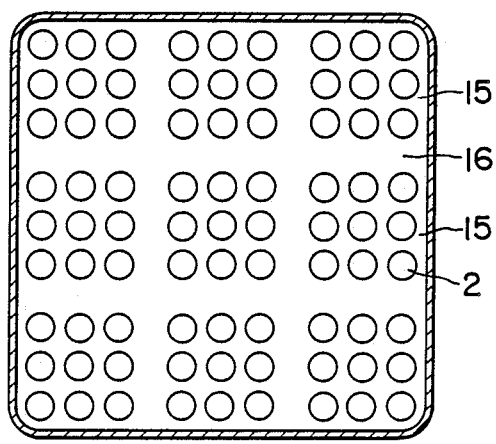
FIG. 33
FIG. 35

FUEL ASSEMBLY FOR NUCLEAR REACTOR

BACKGROUND OF THE INVENTION

This invention relates to a fuel assembly for a nuclear reactor and more particularly to a fuel assembly for a light water reactor such as a boiling water reactor capable of ensuring a long operation cycle and maintaining a high shut-down margin.

A fuel assembly for a boiling water reactor (BWR) is constructed by a square channel box in which a number of fuel rods each comprising a metallic clad in which nuclear fuel material is packed are systematically arranged. The reactor core of the BWR includes a plurality of cells each comprising a cruciform control blade and four fuel assemblies surrounding the control blade and these cells are arranged in a systematic manner in the core. That is, each fuel assembly and control blade have axes perpendicular and parallel to each other, and a coolant operated as a moderator flows from the lower portion towards the upper portion of the reactor core.

Concerning the BWR, steam voids are not formed in a portion near the lower end of the core effective portion, i.e., the lower end of a heat generating portion at which an exothermic reaction is performed, but a large number of voids are generated at the area above the central portion of the reactor core, and the generated voids move up towards the upper portion of the reactor core. Accordingly, the void fraction in the BWR becomes high towards the upper portion of the reactor core, and as a result, the moderation characteristics to neutrons are lowered, whereby the output power is also lowered. In order to obviate these defects, in a conventional technique, it has been a practice to increase the enrichment of the fissile nuclide to be contained in the fuel at a portion of high void fraction, or it has been a practice to mix a burnable poison with the fuel element to suppress the increasing of the power output at a portion of low void fraction.

For the reasons described above, in the BWR, the burn-up at the upper portion of the core is liable to be delayed, and hence the concentration of U-235 becomes relatively higher than that of the other portion of the core. In addition, since a fissile nuclide such as Pu-239 is generated by the voids, it is difficult to maintain the shut-down margin of the reactor core at the upper portion thereof. Moreover, recently, many endeavors have been made for elongating the reactor operation cycle of the reactor and improving the degree of burn-up of the fuel in order to satisfy the economical requirement. In these cases, however, the enrichment of the fuel is necessarily increased, so that the maintenance of the shut-down margin of the reactor is made further difficult.

The fuel assembly which has been conventionally used and a fuel assembly which is expected to be used in the near future for the boiling water reactor (BWR) will be described hereunder by way of typical examples with reference to the drawings.

FIG. 31A is a perspective view of a fuel assembly of conventional type and FIG. 31B is a schematic vertical sectional view of a fuel rod consisting of the fuel assembly.

Referring to FIG. 31A, the fuel assembly comprises water rods, not shown, and fuel rods 2 secured by an upper tie plate 4, a spacer 5 and a lower tie plate 6, and a channel box 1 surrounding the outer periphery of the thus secured water rods and fuel rods 2. Each of the fuel rods 2, as shown in FIG. 31B, comprises a clad or sheath 7, a plurality of fuel pellets 8 arranged in the clad 7, a spring 9 located in a gas plenum disposed above the pellets 8 in the clad 7, an upper plug 10 for closing the upper opening of the clad 7, and a lower plug 11 for closing the lower opening of the clad 7.

FIG. 32 is a cross sectional view of the conventional fuel assembly shown in FIG. 31, in which sixty-two fuel rods 2 and two water rods 3 are arranged in the channel box 1 to constitute the fuel assembly. The water rods 3 serve to suppress the shortage of the water acting as the moderator in the interior of the fuel assembly, but the water rods 3 are axially uniformly arranged, so that there may arise such problems as excessive water condition at the lower portion of the reactor core or water shortage condition at the upper portion thereof.

FIG. 33 also is a cross sectional view of a fuel assembly which has been developed for improving the characteristics of the fuel assembly shown in FIG. 32. The fuel assembly shown in FIG. 33 includes one water rod 12 having a diameter larger than that of the water rod 3 to pass non-boiling water therethrough. However, even in this example, there arises a problem of the excessive water condition at the lower portion of the reactor core and the water shortage condition at the upper portion thereof as described with respect to the former example shown in FIG. 32.

FIG. 34 is a cross sectional view of a further example of a conventional fuel assembly developed for improving the fuel assembly of the type shown in FIG. 32. The fuel assembly of FIG. 34 comprises four square channel boxes 13 each containing sixteen fuel rods 2 which are arranged to constitute a water area of a boiling moderator material, and a cross-shaped space 14 defined by the respective channel boxes 13 constitutes a water area of a non-boiling moderator material to thereby seek a uniform distribution of the output power in the horizontal direction. With the fuel assembly of this character, however, there also arise problems of the excessive water condition at the lower portion of the reactor core and the water shortage condition at the upper portion thereof.

FIG. 35 is a cross section of a still further example of the conventional fuel assembly of a type which is an improvement over that shown in FIG. 34. The fuel assembly of FIG. 35 is constructed by nine sub-bundles 15 each comprising nine fuel rods 2, and relatively wide gaps 16 are defined between the respective sub-bundles 15. With the fuel assembly of this example, the problems of the excessive water condition and the water shortage condition at the lower and upper portions of the reactor core have not been solved.

As described hereinabove, concerning the BWR, steam voids are formed in the area of the heat generating portion of the BWR and the voids move up towards the upper portion of the reactor core. Accordingly, the void fraction in the BWR becomes high towards the upper portion of the reactor core and the average density of the water is lowered. The moderation characteristics relative to neutrons are lowered towards the upper portion of the reactor core and hence the fission rate is also lowered. In other words, the burning progresses at the lower portion of the reactor core and the burning is delayed at the upper portion thereof. In order to obviate this phenomenon for the purpose of suppressing the lowering of the output power at the upper portion of the reactor core, it has been proposed to design the reactor core to increase the enrichment of the fissile nuclide to be contained in the fuel disposed at the upper portion of the reactor core.

However, this design leads to an increase in the reactivity at the upper portion of the reactor core and hence reduces the subcriticality during the shut-down period of the BWR, and is therefore not desirable.

In the meantime, in order to improve the economical requirement by elongating the operation cycle or increasing the take-out burn-up degree, it is most effective to increase the enrichment of the fuel. However, in general, increasing of the fuel enrichment further reduces the subcriticality at the reactor shut-down period. Accordingly, when the fuel enrichment has been largely increased, the reactor may not be safely shut down during the low temperature operation period in certain cases. This point makes it difficult for the conventional fuel to elongate the operation cycle or increase the take-out burn-up degree. In addition, with the conventional fuel assembly, a ratio (H/U) of the number of hydrogen atoms H with respect to the number of uranium atoms U is distributed to be greater at the upper portion of the fuel assembly and smaller at the lower portion thereof due to the distribution of the voids during the power operation period. Accordingly, the average infinite multiplication factor in the reactor core is not made sufficiently high during the reactor power operation period, which is also a significant problem of the nuclear reactor.

SUMMARY OF THE INVENTION

An object of this invention is to substantially eliminate the drawbacks and defects encountered in the conventional technique described above and to provide an improved fuel assembly particularly constituting a reactor core of a water boiling reactor capable of ensuring the maintenance of reactor shut-down margin even with increasing of the enrichment of a fuel and improving an axial output power distribution in the reactor core.

Another object of this invention is to provide a fuel assembly for a reactor core capable of making flat the distribution of the ratio of the number of hydrogen atoms to the number of uranium atoms throughout the axial upstream side and downstream side of the reactor core to thereby make the infinite multiplication factor large, thus improving the neutron economy.

These and other objects can be achieved according to this invention in one aspect thereof by providing a fuel assembly of the type in which a number of fuel rods, each constructed by filling a clad with a fuel material, are arranged, the fuel assembly comprising a water rod having a cross sectional area larger than that of each of the fuel rods, first fuel rods each having a whole effective fuel zone filled with a fuel material throughout the entire axial length of the clad of the fuel rods, and second fuel rods each having a partial effective fuel zone filled with a fuel material and having an interposed zone in which enrichment of a fissile nuclide is significantly reduced in the clad of the fuel rod or the fissile nuclide does not exist at all, the second fuel rod being arranged so as to surround the water rod and the interposed zone being located on an axial level including a portion at which subcriticality is made small at a period in which maintenance of reactor shut-down margine is made difficult during a reactor operation period.

In another aspect of this invention, there is provided a fuel assembly for a nuclear reactor of the type in which a number of fuel rods, each constructed by filling a clad with a fuel material, are arranged, the fuel assembly comprising a water rod provided with an upper portion having a cross sectional area larger than that of each of the fuel rods and a lower portion having a cross sectional area smaller than that of the upper portion of the water rod, full-length fuel rods each having an axial length substantially equal to the axial length of the fuel assembly, and at least two kinds of short fuel rods each having a length shorter than that of the full-length fuel rod.

According to the fuel assembly of the character described above, since the interposed zones of the fuel rods in which the enrichment of the fissile nuclide is significantly reduced are arranged so as to surround a water rod having a large diameter or size, excessive water exists in or around the water rod, so that the water rod or the portion nearby is over moderated during the reactor cold operation period. The neutron multiplication factor of the fuel is lowered, and the reactor shut-down margin is increased. On the other hand, during the reactor high temperature operation period, and particularly, when the voids occur at the outer peripheral portions of the water rod, the excessive water can be removed, so that the neutron multiplication factor is recovered. There has been proposed a new concept that the voids are created in the water rod, but in such a case, the neutron multiplication factor will be further improved. This phenomenon will be mainly realized by the action of thermal neutrons each having a short diffusion length. More specifically, since the density of water is large (i.e., about 1.0 g/cm$^3$) in the reactor cold operation period, the diffusion length of the thermal neutron becomes small and the interaction of the thermal neutrons in the zones adjacent to the interposed zone of the fuel rod is reduced, and as a result, the neutron multiplication characteristics are lowered. With the boiling water reactor, the temperature of the water is about 286° C. (reference value) during the reactor high temperature operation period, and the density of the water is about 0.74 g/cm$^3$ even when no void occurs. The migration length of the neutron in the water is increased to about 1/0.74 (i.e. 1.35) times that in the reactor cold operation period. Moreover, the density of the gas-water mixture in the occurrence of the voids is lowered to an extent of about 0.3 g/cm$^3$, and as a result, the thermal neutron diffusion length in the gas-water mixture is increased to 1/0.3 ($\doteqdot$3) times. As the large water rod is designed so as not to generate voids ordinarily, the density of water is about 0.74 g/cm$^3$ and is lowered to about 0.3 g/cm$^3$ at the outer peripheral portion of the water rod, the average of these values being about 0.5 g/cm$^3$. Consequently, the neutron mutual interaction in the fuel zones adjacent to the interposed zones surrounding the large water rod is increased, and hence the neutron multiplication characteristics are also increased.

According to the functions described above, it is possible to design a reactor core in which the multiplication factor is lowered, that is, the reactor shut-down margin (subcriticality) is made large during the reactor cold operation period. On the other hand, the multiplication factor can be prevented from decreasing even when the fuel amount is reduced by the location of the interposed zone during the reactor high temperature operation period.

According to another aspect of the fuel assembly of this invention, the ratio of the number of hydrogen atoms with respect to the number of uranium atoms in the upper and lower portions of the fuel assembly can be caused to approach the most suitable value to enhance the reactivity of the reactor and improve the fuel economy during the reactor operation period. On the other hand, during the reactor low temperature shut-down period, the reactivity can be lowered to maintain the reactor shut-down margin.

The preferred embodiment of the fuel assembly according to this invention will be described further in detail hereunder with reference to the accompanying drawings.

BRIEF DESCRIPTION OF THE DRAWINGS

In the accompanying drawings:

Figures 23B, 23C, 23D:
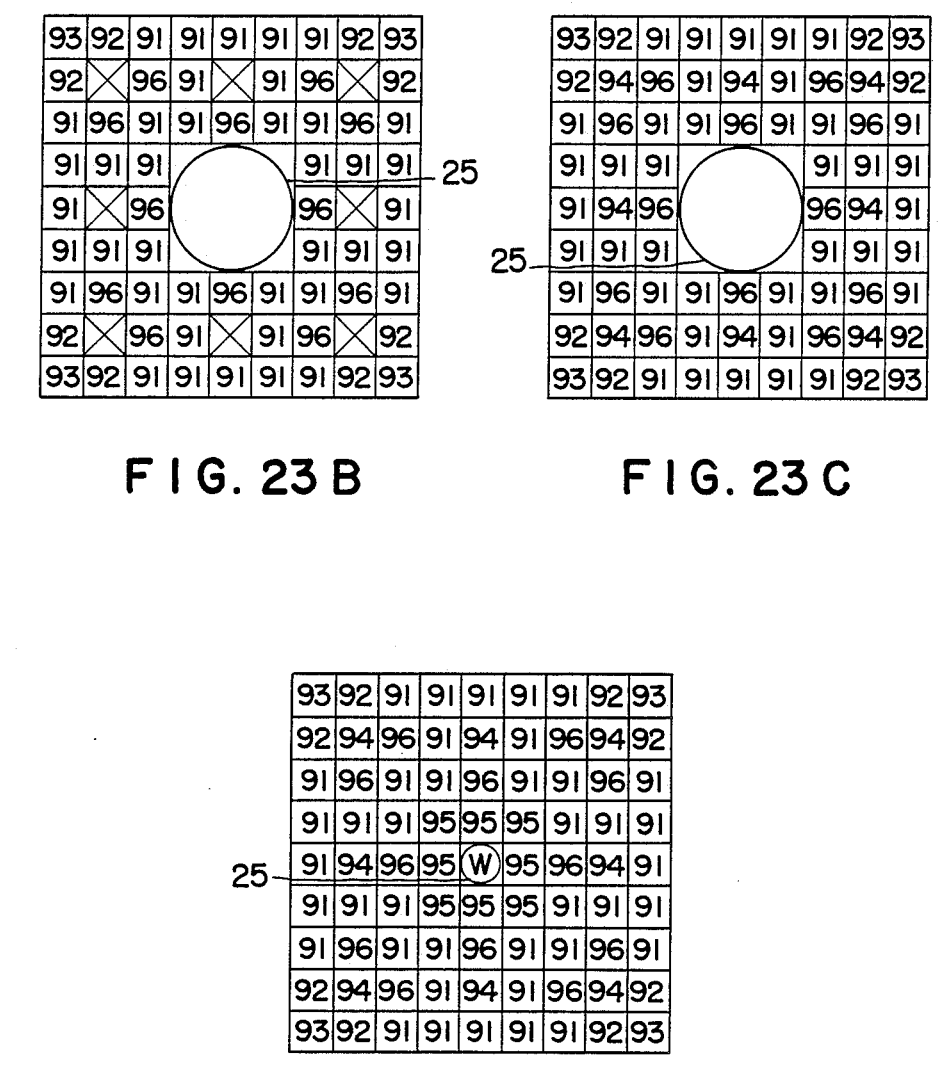

FIGS. 23A to 23D show elevational and cross sections of the seventeenth embodiment according to this invention;

Figures 29B, 29C, 29D:
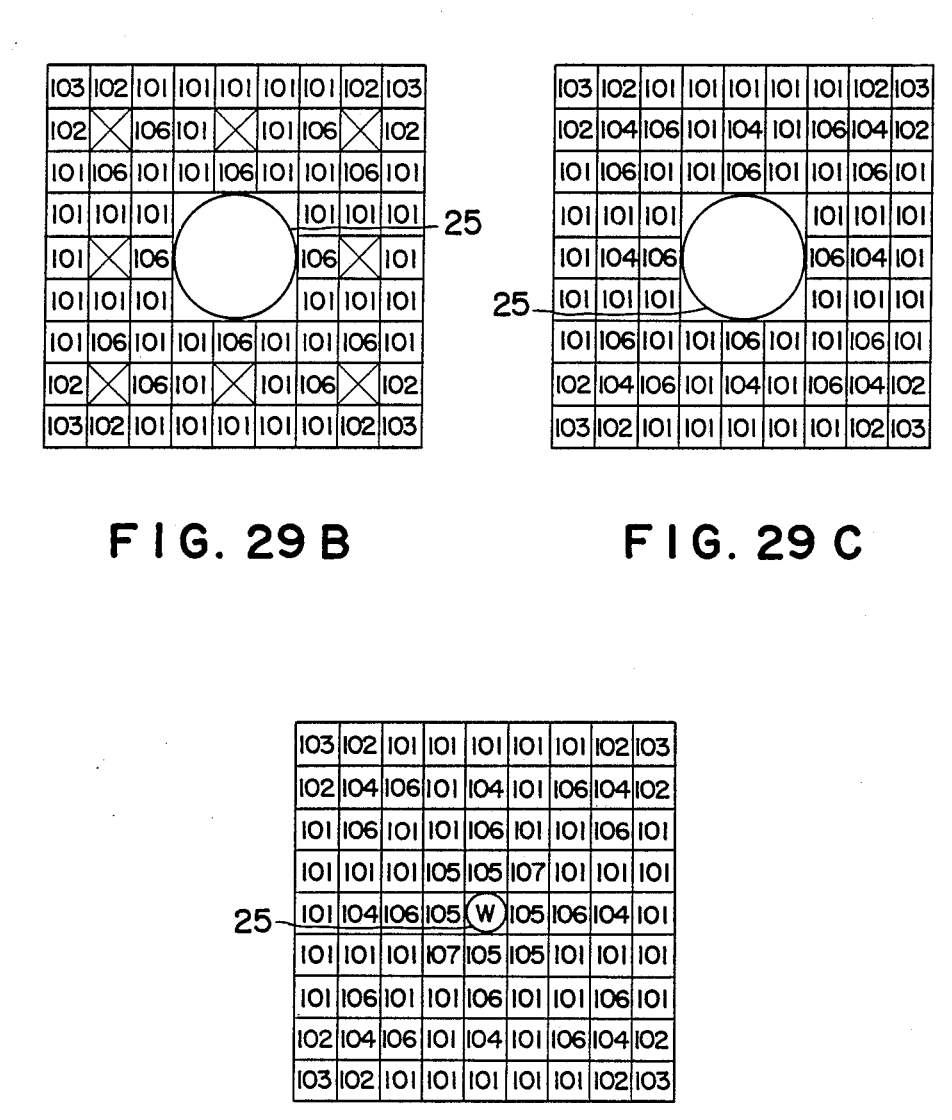

FIGS. 29A to 29D are elevational and cross sections of the eighteenth embodiment according to this invention;

FIGS. 30A to 30D are elevational and cross sections of the nineteenth embodiment according to this invention;

FIG. 31A is a perspective view of a conventional fuel assembly;

FIG. 31B is an elevational section of one fuel rod used for the fuel assembly shown in FIG. 31A;

FIG. 32 is a cross sectional view of a conventionally typical fuel assembly; and FIGS. 33, 34, and 35, are cross sections of improved fuel assemblies conceived by the inventors of this application before the completion of this invention.

DESCRIPTION OF THE PREFERRED EMBODIMENTS

In advance of the detailed description of the preferred embodiments of this invention, the fundamental theory or basic principle according to this invention will be described hereunder with reference to the accompanying drawings.

We have studied through experiments and analyses the variation of reactor characteristics in the case where a water zone or area is interposed into a fuel zone or area in the nuclear reactor core. A part of our studies has been published in papers announced in the Third International Conference on the Peaceful Uses of Atomic Energy (ICPUAE) held in 1964 (Proc. 3rd Geneva. Conf., P846, Vol. 3, Page 79 (1964), FIG. 15).

Figure 1A:
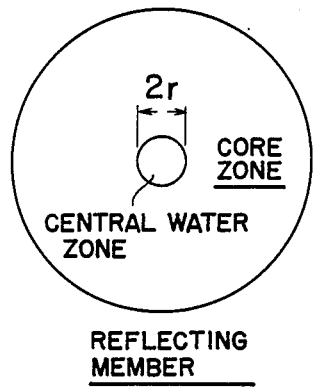
FIGS. 1A and 1B are a plan view and a graph for an explanation of the basic principle of this invention.
Figure 1B:
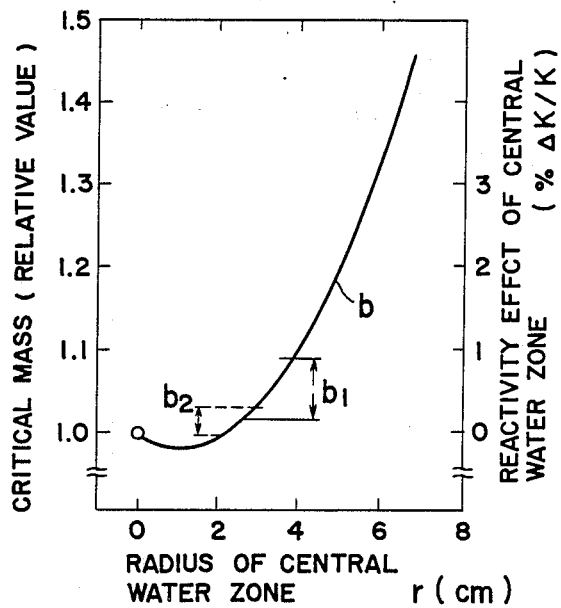

The case where a reactor core substantially annular in cross section is arranged in water and the radius r of a central water zone of the reactor core is varied as shown in FIG. 1A will be considered. In this case, the outer periphery of the core zone is constructed as a water reflector. A critical experiment was performed with the conditions of a fuel enrichment at the core zone of 2.6% and a volume ratio of water to the fuel of about 1.8. FIG. 1B is a graph in which critical mass in the constant height of the core is represented by relative values as a function of the radius r. The righthand vertical axis of FIG. 1B designates scales representing the effects of the reactivity of the water zone converted from the variation of the reactivity of the core due to the radius of the water zone, the radius of the core being constant (20 cm). According to this scaling, the critical mass and the reactivity effect of the water zone can be displayed by one curve (generally, these are not represented by one curve). The reason why the critical mass is rather reduced in a range of the radius r of 0 to 2 cm is that a reactor core used is slightly under moderate, and such phenomenon may be often caused in the core of the actual LWR. In other words, this matter is based on the same fact that the reactivity of the core is improved by drawing out a part of fuel rods from the upper portion of the BWR core having a high void factor and substituting with a moderator such as a water rod. When the radius r of the central water zone increases over 2 cm, the critical mass accordingly increases, the reactivity thus becoming negative. In case the outer diameter R of the reactor core is set at a fixed value (R=0), and only the radius r is increased over 2 cm, the core is made subcritical, and the subcriticality increases as a quadric curve in accordance with the increasing of the radius r.

Now, referring to FIG. 1B, assuming that the radius r of the central water zone varies from 2.5 cm to 3.8 cm, the reactivity of the core varies towards the side at which the subcriticality becomes high by 0.8% $\Delta k/k$ as designated by the variation ($b_1$) of the curve b. Although in this case the density of the water in the central water zone is 1.0 g/cm$^3$, it is now assumed that the density thereof is 0.7 g/cm$^3$. In view of the reaction probability between neutrons and water, the radius of the central water zone is approximately equivalent to the variation from a value 0.7×2.5 cm (1.8 cm) to a value 0.7×3.8 cm (2.7 cm), and in this time, the variation of the core reactivity is 0.3% $\Delta k/k$ ($b_2$) and not 0.8% $\Delta k/k$. Such characteristics are based on an elementary principle explaining the characteristic that the reactivity loss due to the location of the water rod during the high temperature operation period of the LWR is small, but the loss is large during the cold operation period, i.e. large shut-down margin. Since the water density varies in the fuel zone in the actual LWR, the curve b in FIG. 1B is widened rightwardly as viewed.

Figure 2B:
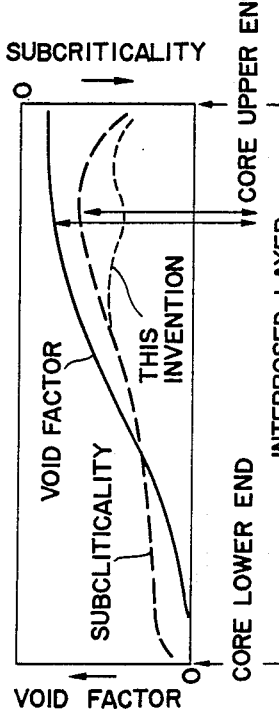
FIGS. 2A and 2B, FIGS. 3A and 3B and FIG. 4 are graphs also for an explanation of the basic principle, functions, and effects of this invention.
Figure 2A:
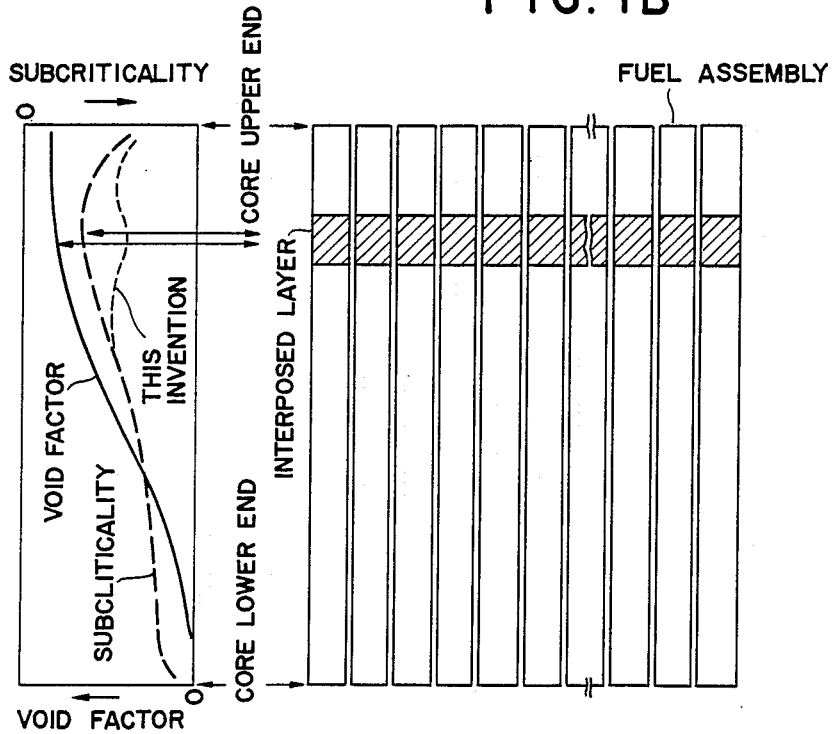

FIGS. 2A and 2B are illustrations for an explanation of concepts of the characteristics in the axial direction of an existing BWR having an effective core length more than 3 m and the characteristics in a case where the fuel assembly according to this invention is charged in the core. That is, as shown in FIG. 2B, the void fraction increases towards the upper portion of the BWR core, and at this portion, the production accumulation ratio of plutonium is made high, and the consumption ratio of U-235 or Pu-239 is made low. Accordingly, during the reactor cold operation period, it is most difficult to maintain the reactor shut-down margin at a portion apart from the upper end of the effective fuel zone by a distance 1/6L to $\frac{1}{4}$L (L: entire length of the effective fuel zone). When the present invention is applied to this portion as shown in FIG. 2A, the local subcriticality distribution (i.e., importance distribution) is improved as shown in FIG. 2B.

Figure 3A:
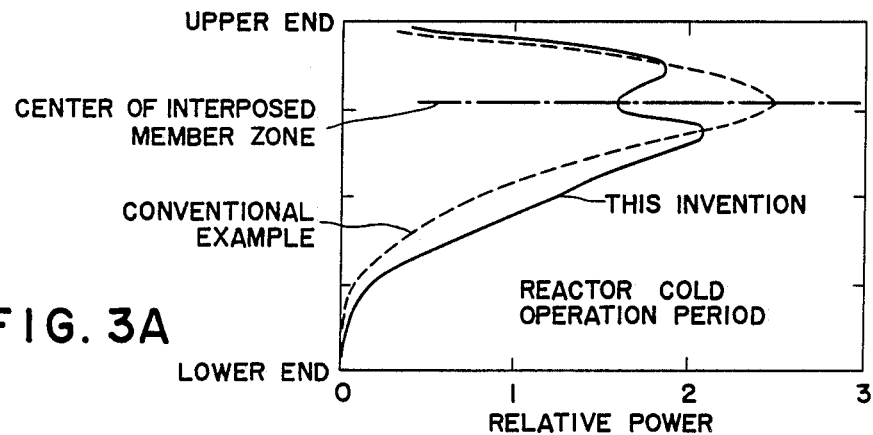

FIG. 3 is a graph showing one example of a result based on the actual calculation of the characteristics shown in FIG. 2. Referring to FIG. 3, in the assumption of the average of the burn-up degree being 30GWd/t (33G Wd/t) and of the typical axial burn-up distribution, an axial output power distribution is obtained in consideration of the difference in the fuel composition due to the void distribution in the axial direction of the core. FIG. 3A shows a power distribution in the axial direction during the cold shut-down period, which may not be said to be a practical phenomenon, but may be said to be a power distribution based on the calculation. However, although the shape of the curve shown is not itself in proportional relationship to the local subcriticality, it is well known that both are extremely correspondent to each other. That is, the shape of the power distribution well represents the local subcriticality, and position of high reactivity substantially corresponds to the power peak position.

For example, with a conventional fuel assembly, when an interposed member with a width of 15 cm is inserted at a portion apart from the upper end of the core by about $\frac{1}{4}$ length of the core length and at which a relative output power is made maximum (refer to the broken line in FIG. 3A), the peak of the relative power is largely reduced (refer to the solid line in FIG. 3A). This means that the subcriticality in a portion having the locally small subcriticality has been effectively improved.

Figure 3B:
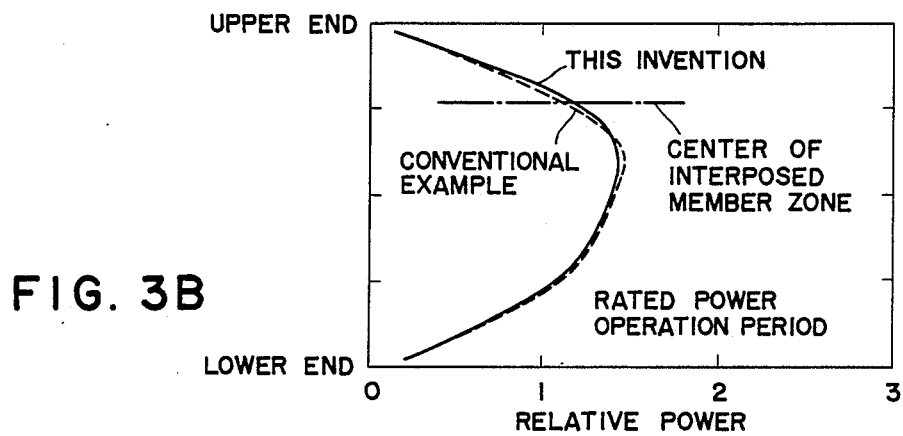

FIG. 3B is a graph showing the axial power distribution of the reactor during the rated power operation period, which is minutely varied by the application of the present invention, and it will be found that the axial power distribution is made slightly more flat because of the improvement of the power distribution in the interposed zone.

Figure 4:
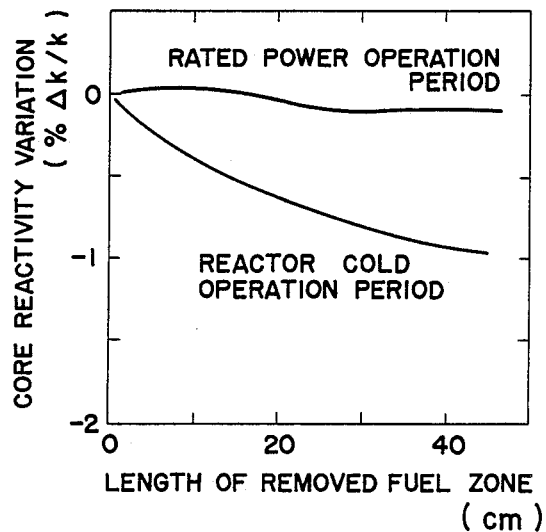

FIG. 4 is a graph representing the variations of the reactivities during the rated power operation period and the cold shut-down period, respectively, in the case where the position of the interposed zone is stationary and the length thereof is varied. In this calculation example, the interposed zone is evacuated. Referring to FIG. 4, when the length of the interposed zone is changed, the reactor reactivity during the rated power operation time is not substantially changed and the curve representing the reactor reactivity during the cold shut-down period is slightly lowered, but a rapid saturated phenomenon is not caused and the subcriticality is made high in accordance with the length of the interposed zone. In the case where a depleted uranium is accommodated in the interposed zone, the reactivity is varied substantially similarly to that in the case of the evacuated interposed zone, the width or difference between both curves becomes slightly small. A similar phenomenon will be observed when natural uranium is inserted. The amount of the fissile nuclide loaded in the fuel assembly may be reduced in accordance with the arrangement of the interposed zone, but the power loss based on this reduction of the fissile nuclide can be recovered by increasing the enrichment of the fuel material by about 0.05 wt % in portions other than the interposed zone, thus eliminating the problem of the loss of fuel economy.

With a reactor core having a short effective core length such as 2 m, the peak position of the power distribution (importance distribution) during the cold operation period is downwardly shifted in comparison with the core referred to hereinabove, and in such a case, it is natural that the interposed zone is also shifted to be arranged near the peak position.

When the axial length of the interposed zone is increased, the reactivity is degraded during the low temperature operation period, and the degree of the degradation is gradually saturated and the degradation of the reactivity is substantially eliminated in the case where the length of the interposed zone increases over about $\frac{1}{3}$ length of the entire effective fuel zone. This fact means that the interposed zone is preferably designed with an axial length less than about $\frac{1}{3}$ length of the entire effective fuel zone.

Figure 5A:
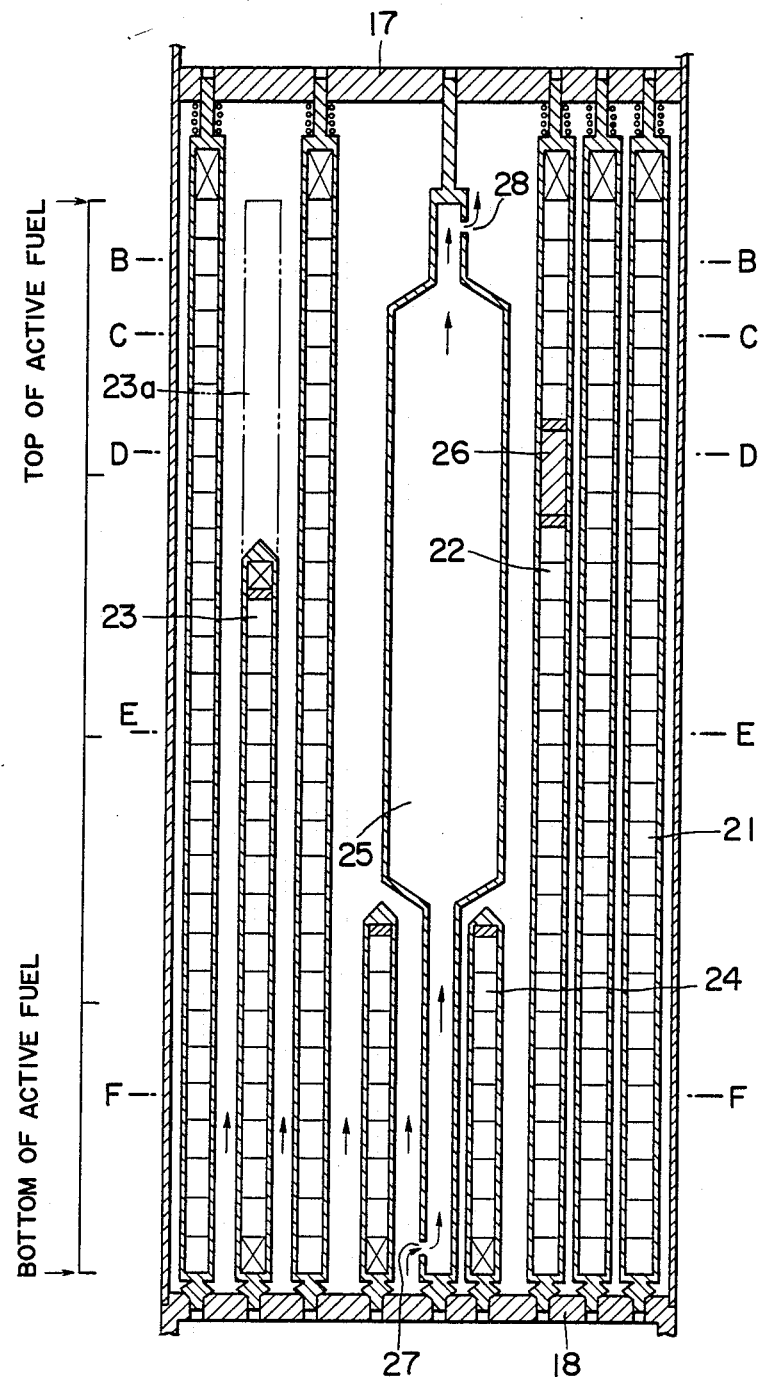
FIG. 5A is an elevational section and FIGS. 5B to 5F are cross sections of the first embodiment of a fuel rod according to this invention.
Figure 5B:
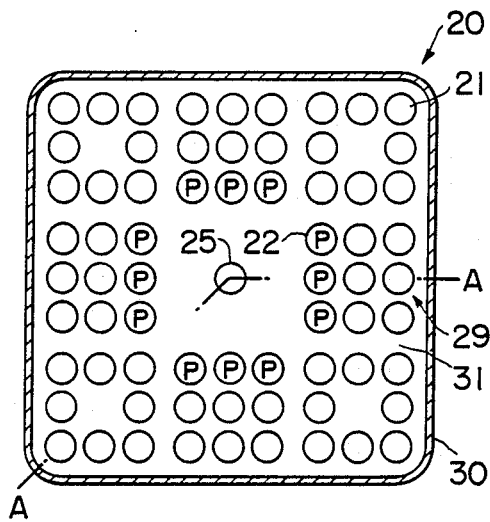

FIG. 5 is a schematic illustration for an explanation of one preferred embodiment according to this invention conceived on the basis of the basic principle described hereinbefore, in which FIG. 5A is a sectional view taken along the line A—A shown in FIGS. 5B to 5F, which are also cross sections taken along the lines B—B, C—C, D—D, E—E and F—F respectively shown in FIG. 5A.

A fuel assembly 20 according to this embodiment, as shown in FIGS. 5A to 5F, comprises a water rod 25 circular in cross section arranged in substantially the central portion of the fuel assembly 20 and provided with an upper portion having a diameter larger than a fuel rod 21 and a lower portion having a diameter substantially equal to that of the fuel rod 21 (this water rod 25 being called large water rod hereinafter), eight sub-bundles 29, each consisting of nine fuel rods 21 (three rows and three lines), arranged so as to surround the large water rod 25 with gaps 31 respectively therebetween in a lattice form, and a channel box 30 surrounding the outer periphery of the thus arranged sub-bundles 29 of the fuel rods 21. The upper and lower portions of the water rod 25 and the fuel rods 21 are supported by upper and lower tie plates 17 and 18. A water intake port 27 and a water drain port 28 are arranged at the lower portion and the upper portion of the large water rod 25, respectively.

The fuel rods constituting the sub-bundles 29 include full-length fuel rods 21 each constructed by a clad in which a fuel material is charged through the entire length thereof and having an axial length substantially equal to that of the fuel assembly 20, partial-length fuel rods 22 each having, in a clad, a reduced effective fuel zone and an interposed zone in which the enrichment of the fissile nuclide is extremely lowered or the fissile nuclide does not exist at all (this fuel rod 22 being called a fuel rod with an interposed zone, hereinafter, and in FIG. 5, designated by letter P), first short fuel rods 23 (designated by letter LR in FIG. 5) each having an axial length shorter than that of the full-length fuel rod 21, and second short fuel rods 24 (denoted by letter SR in FIG. 5) each having an axial length further shorter than that of the first short fuel rod 23.

According to the construction of the fuel assembly 20 of this embodiment, the large water rod 25 is arranged in the central portion thereof and the fuel rods 22 (P) with the interposed zones of the respective sub-bundles 29 are arranged so as to oppose the outer surface of the large water rod 25. The first short fuel rod 23 (LR) is arranged at the central position of each sub-bundle 29 which is disposed at the corner portion of the fuel assembly 20, and eight second short fuel rods 24 (SR) are arranged so as to surround the fine lower portion of the water rod 25. The fuel assembly 20 of this embodiment substantially includes fifty-six full-length fuel rods 21, twelve fuel rods 22 with the interposed zones, four first short fuel rods 23, and eight second short fuel rods 24. The first and second short fuel rods 23 and 24 are usually provided with plenums at their lower portions for preventing the degradation of the fuel economics. This is because, in the lower plenum, the neutron flux is not dense, and the burn-up progresses less. The first short fuel rods 23 may be provided with upper plenums as occasion demands.

The central portion of the interposed member 26 of the fuel rod 22 is positioned at a height of ⅜H (H: effective length of the full-length fuel rod) from the lower end of the effective length of the fuel rod and the maintenance of the shut-down margin is particularly difficult in a range having an axial width of about ¼H including the central portion of the interposed member 26 of the fuel rod 22 with the interposed zone. As a typical example of the interposed member 26, a hollow tube, a graphite, a $ZrH_2$ pellet or water to be contained in the interposed zone will be utilized, although described hereinafter.

Although the void fraction is high in the upper portion of the fuel assembly during the reactor operation period and the pressure loss of the coolant is therefore remarkable, the pressure loss of the coolant is effectively reduced by widening the passage thereof by the location of a vanishing zone at the upper portion of the fuel assembly by locating the first short fuel rods 23. In addition, since the fuel rod is often provided with a natural uranium blanket at a portion apart from the top end of the fuel rod by about 15 to 30 cm, the suitable ratio H/U is low in the case of enriched uranium and there is no need for the location of the large water rod, so that a water rod having a small diameter, as shown, can be adopted. In the case where a moderated uranium is charged as the interposed member, it is economical for the fuel material to use the moderated uranium for the blanket because the kinds of the enrichments are not increased and the separation working cost is reduced.

Furthermore, the interposed members 26 of the fuel rods 22 provided with the interposed zones are positioned at a portion at which the reactor shut-down margin is made smallest, i.e., a portion near the line D—D in FIG. 5A during the reactor shut-down period, so that the central no-fuel zone (in which the fuel material does not exist) can be effectively widened.

Figure 5D:
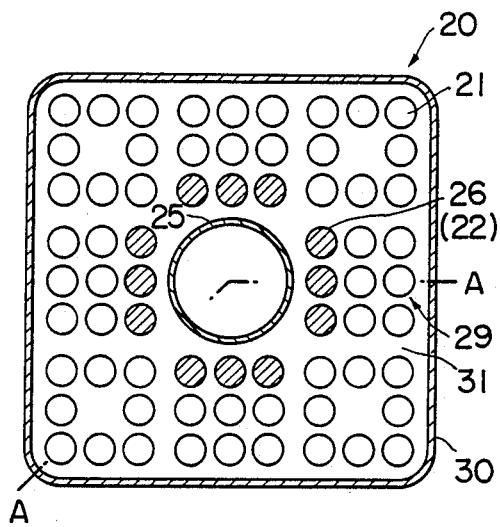
Figure 5C:
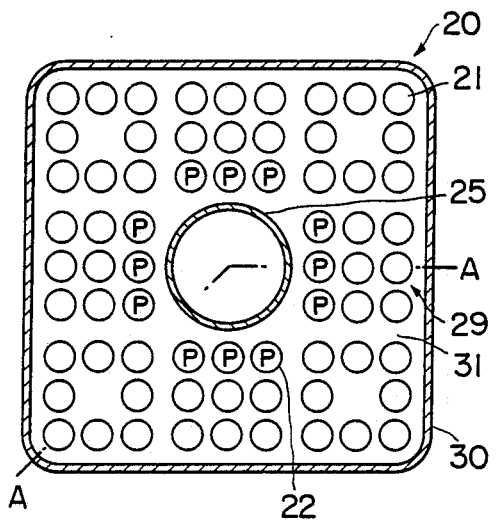
Figure 5E:
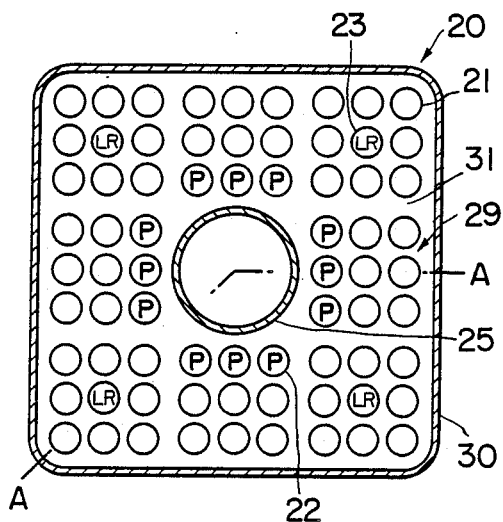
Figure 5F:
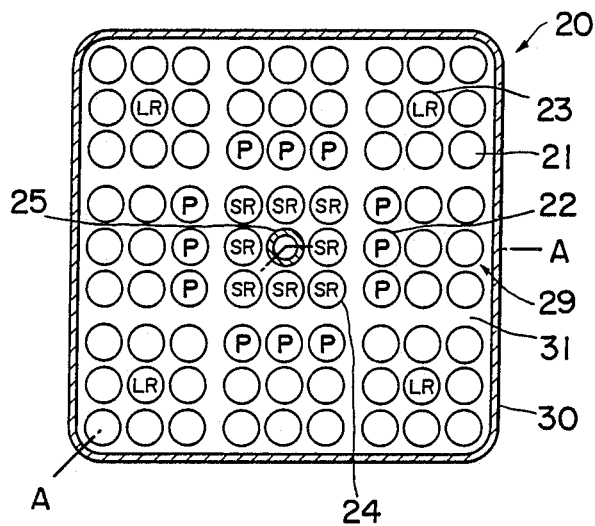
Figure 6:
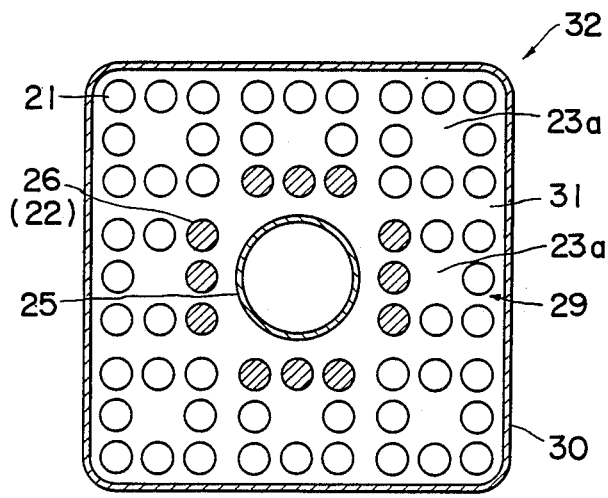
FIGS. 6 to 17 are cross sections respectively showing the second to thirteenth embodiments of the fuel assemblies according to this invention.

FIG. 6 is a cross section of the second embodiment according to this invention which corresponds to the embodiment shown in FIG. 5D. Like reference numerals are used to designate elements or members corresponding to those shown in FIG. 5, and this designation will be used for other embodiments which will be described hereinafter.

Referring to FIG. 6, in the fuel assembly 32 of this embodiment, the first short fuel rods 23 are disposed at the central portions of the respective sub-bundles 29, and accordingly, the number of the vanishing portions 23a is increased in comparison with the fist embodiment shown in FIG. 5. The arrangement of the fuel rods 22 with the interposed zones is not changed. The fuel assembly 32 of this embodiment thus includes fifty-two full-length fuel rods 21, twelve fuel rods 22 with the interposed members, eight first short fuel rods 23 and eight second short fuel rods 24.

Figure 7:
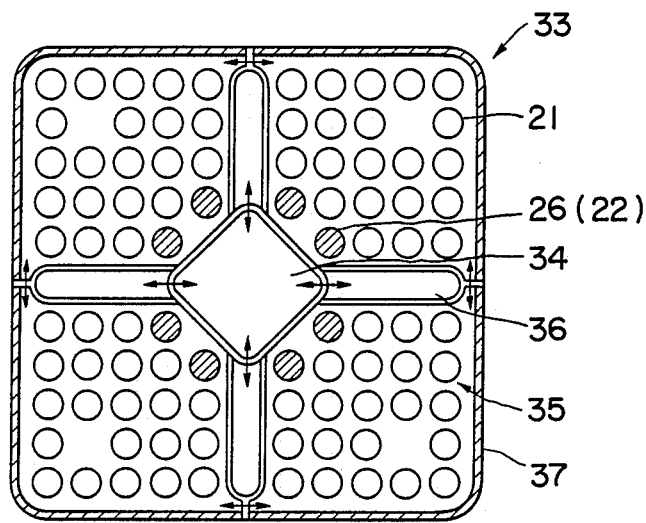

FIG. 7 shows a cross section of the third embodiment according to this invention. The fuel assembly 33 of this embodiment includes a water rod 34 of substantially square cross section having a size corresponding to four fuel rods positioned at the central portion of a channel box 37. The square water rod 34 is inclined in the cross section by about 45° with respect to the respective sides of the channel box 37, and four channels 36 are arranged in cruciform configuration to define the interior of the fuel assembly 33 into four sub-bundles 35 each including 5×5 (five rows and five lines) fuel rods except for one removed fuel rod to be arranged at the inner corner portion of the sub-bundle 35 for the location of the water rod 34. Two fuel rods of the respective sub-bundles 35 facing the side surfaces of the water rod 34 are constructed as fuel rods 22 with the interposed members. Non-boiled moderator-water flows through the square water rod 34 and the cruciform channel 36, whereas boiled cooling water flows through the sub-bundles 35. Water pass ports are provided for the respective corners of the square water rod 34. According to the arrangement of this embodiment, the flow passages are widened, so that the sufficient reactor shut-down margin can be maintained, the reduction of the pressure loss can be improved, the void factor can be also improved, and the axial output power distribution can be also improved. The fuel assembly 33 of this embodiment includes eighty-four full-length fuel rods 21, eight fuel rods 22 with the interposed members, and four first short fuel rods 23 With this embodiment, the lower portion of the water rod 34 may be designed so as to have a cross section smaller than that of the upper portion thereof, and the second short fuel rods 24 may be arranged around the thus narrowed lower portion of the water rod 34. According to this arrangement, the reactor core can be more effectively operated, and this arrangement may be applied to the other embodiments described hereinafter, but not described specifically.

Figure 8:
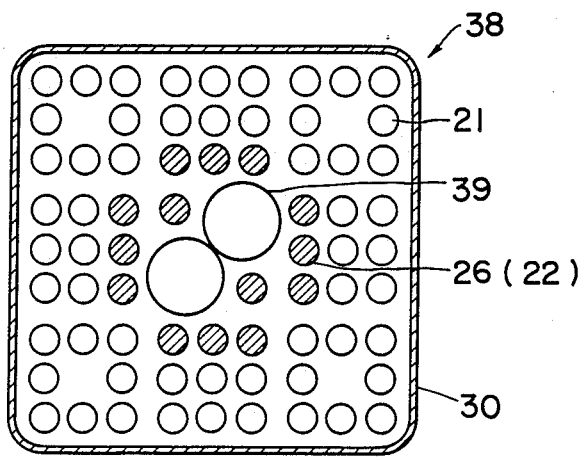

FIG. 8 is a cross sectional view of the fourth embodiment according to this invention, which corresponds to that shown in FIG. 5D.

The fuel assembly 38 of this embodiment includes two large water rods 39 instead of one large water rod arranged centrally in the fuel assembly shown in FIG. 5D, the large water rods 39 being arranged adjacently on one diagonal line of the channel box 30 as shown in FIG. 6. Two fuel rods 22 with the interposed members are also adjacently arranged on the other diagonal line thereof. The fuel assembly 38 of this embodiment functions in substantially the same manner as that of the first embodiment and includes fifty-six full-length fuel rods 21, fourteen fuel rods 22 with the interposed members, and four first short fuel rods 23.

Figure 9:
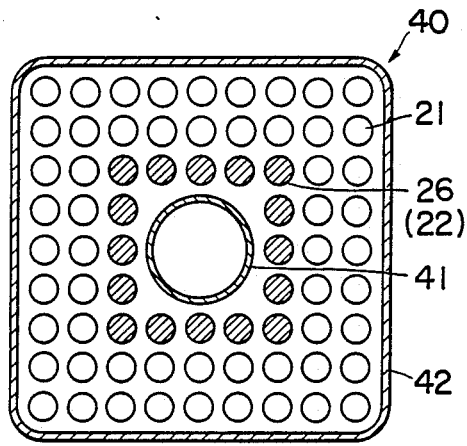

FIG. 9 is a cross sectional view of the fifth embodiment according to this invention which corresponds to that shown in FIG. 5D.

The fuel assembly 40 of this embodiment includes a large water rod 41 at the central portion of a channel box 42 and has a size approximately corresponding to nine fuel rods. Fuel rods are also arranged in the channel box 42 in nine rows and nine lines except for the central portion thereof, and fuel rods surrounding the central water rod 41 are constructed as fuel rods 22 with the interposed members for alleviating water shortage in the upper portion of the reactor core during the high temperature operation period. The fuel assembly 40 of this embodiment includes fifty-six full-length fuel rods 21 and sixteen fuel rods 22 with the interposed members.

Figure 10:
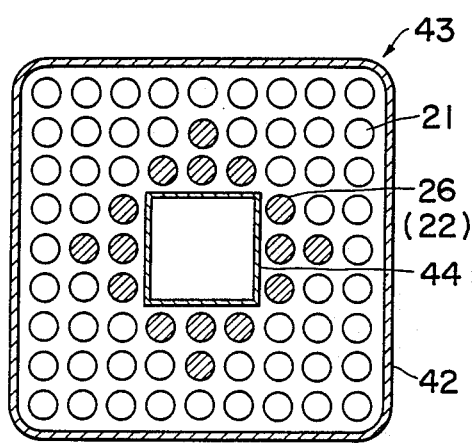

FIG. 10 is a cross sectional view of the sixth embodiment according to this invention which corresponds to that shown in FIG. 5D.

The fuel assembly 43 of this embodiment includes one large water rod 44 of square cross section arranged at the central portion of a channel box 42 and having a size corresponding to nine fuel rods. Fuel rods are arranged in nine rows and nine lines in the channel box 42 except for the central portion thereof. Fuel rods surrounding the square water rod 44 and fuel rods arranged at the central portions of the second lines and second rows thereof are constructed as fuel rods 22 with the interposed members. According to this arrangement, the water shortage in the upper portion of the reactor core during the high temperature operation period can be effectively alleviated. The fuel assembly 43 includes fifty-six full-length fuel rods 21 and sixteen fuel rods 22 with the interposed members.

Figure 11:
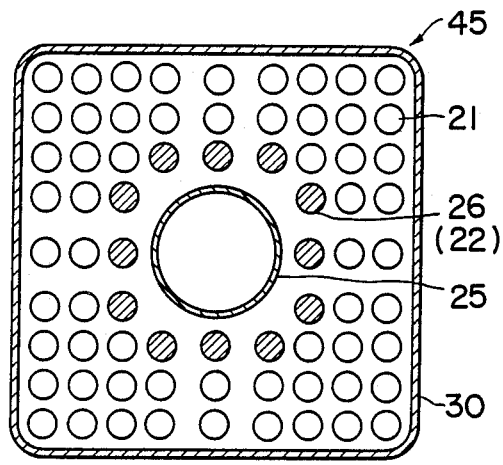

FIG. 11 is a cross sectional view of the seventh embodiment according to this invention which corresponds to the embodiment shown in FIG. 5D.

The fuel assembly 45 of this embodiment includes fuel rods in form of 4-1-4 lattice arrangement (in which four-one-four fuel rods in each line and four-one-four fuel rods in each row are arranged), and a large water rod 25 having a size corresponding to nine fuel rods is arranged at the central portion of the fuel assembly 45. Twelve fuel rods 22 with the interposed members are arranged so as to surround the large water rod 25, and sixty full-length fuel rods 21 are also arranged in the fuel assembly 45. Accordingly, the water zone can be made large at portions of the fuel assembly in the level of the locations of the interposed members 26 of the fuel rods 22, so that the effective multiplication factor hot Keff during the high temperature operation period can be effectively increased, and the effective multiplication factor cold Keff during the cold operation period can be effectively decreased (i.e., maintenance of large reactor shut-down margin).

Figure 12:
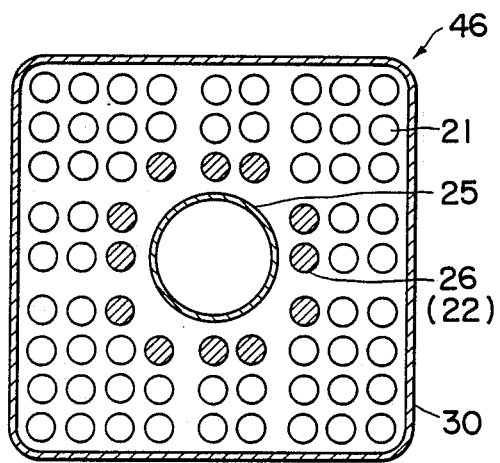

FIG. 12 is a cross sectional view of the eighth embodiment according to this invention which corresponds to the embodiment shown in FIG. 5D.

The fuel assembly 46 of this embodiment includes fuel rods in the form of 4-2-3 lattice arrangement, and a large water rod 25 having a size corresponding to nine fuel rods is arranged in the central portion of the fuel assembly 46. Twelve fuel rods 22 with the interposed members are disposed so as to surround the large water rod 25, and sixty fuel rods 21 are also disposed in the fuel assembly 46. The arrangement of these fuel rods and water rod may be effectively utilized for a fuel assembly in which water gaps at the outer periphery thereof are not uniformly designed. This embodiment achieves the large shut-down margin as described with respect to the first embodiment.

Figure 13:
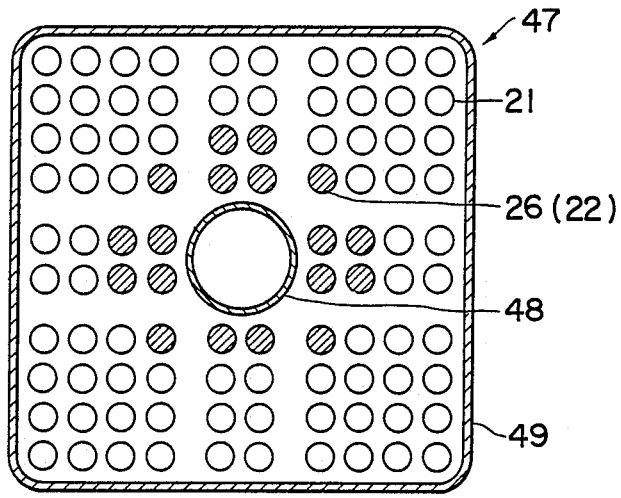

FIG. 13 is a cross sectional view of the ninth embodiment according to this invention which corresponds to the embodiment shown in FIG. 5D.

The fuel assembly 47 of this embodiment includes fuel rods in form of 4-2-4 lattice arrangement and a large water rod 48 having a size corresponding to four fuel rods located at the central portion of the fuel assembly. Twenty fuel rods 22 with the interposed members are arranged so as to surround the large water rod 48 and the seventy-six full-length fuel rods 21 are also located in the fuel assembly 47.

Figure 14:
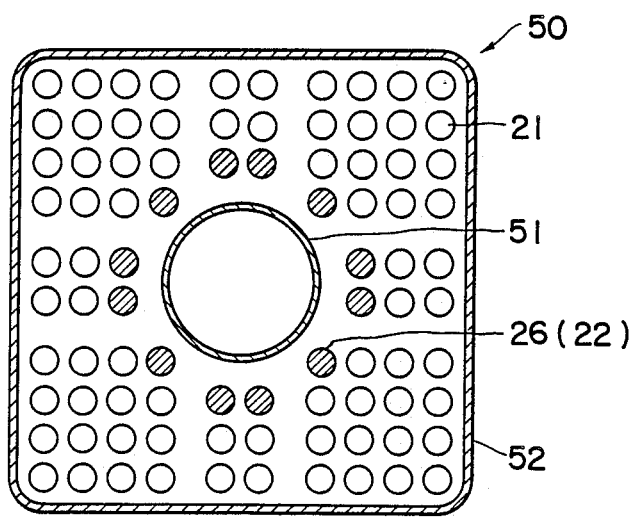

FIG. 14 is a cross sectional view of the tenth embodiment according to this invention which corresponds to that shown in FIG. 5D.

The fuel assembly 50 of this embodiment includes fuel rods in form of 4-2-4 lattice arrangement and a large water rod 51 having a size corresponding to twelve fuel rods in the central portion of the fuel assembly. Twelve fuel rods 22 with the interposed members are disposed so as to surround the large water rod 51, and seventy-six full-length fuel rods 21 are also disposed in the fuel assembly 50.

Figure 15:
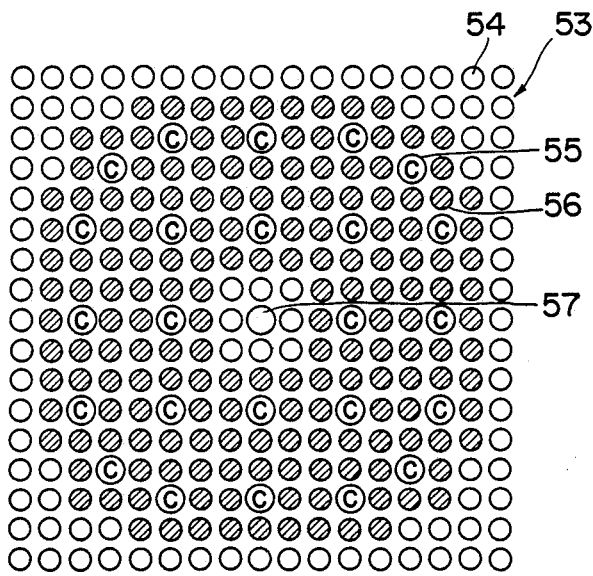

FIG. 15 is a cross sectional view of the eleventh embodiment according to this invention, which is applicable to a pressurized water reactor (PWR) of $17 \times 17$ type (seventeen lines and seventeen rows of fuel rods). The fuel assembly 53 of this embodiment includes the full-length fuel rods 54, the fuel rods 56 with the interposed members, control rod guide tubes 55 each having a diameter larger than that of the fuel rod 54 or 56, and an in-core instrumentation guide tube 57 arranged in the central portion of the fuel assembly. The control rod guide tubes 55 are surrounded by the fuel rods 56 with the interposed members and attain the function as water rods during the reactor operation period. Accordingly, since the large water zone can be formed in portions of the fuel rods at the level of the location of the interposed members of the fuel rods 56, the reactor shut-down margin is effectively improved. In an alternative arrangement, the fuel rods 56 with the interposed members are arranged so as to surround the in-core instrumentation guide tube 57, but the usual full-length fuel rods 54 are disposed in this embodiment for preventing increased instrumentation error.

Figure 16:
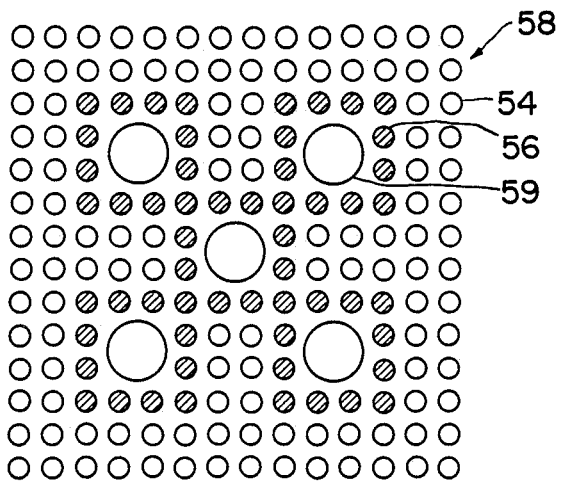

FIG. 16 is a cross sectional view of the twelfth embodiment according to this invention, which is applicable to the reactor core of the $14 \times 14$ fuel arrangement (pressurized water type light water moderated type reactor core). The fuel assembly 58 of this embodiment includes the full-length fuel rods 54, the fuel rods 56 with the interposed members, and the control rod guide tubes 59 each having a diameter larger than that of the control rod guide tube 55 of the former embodiment shown in FIG. 15. The control rod guide tubes 59 are surrounded by the fuel rods 56 with the interposed members and can attain substantially the same functions and effects as those of the former embodiment because the control rod guide tubes 59 operate as water rods during the reactor operation period.

Figure 17:
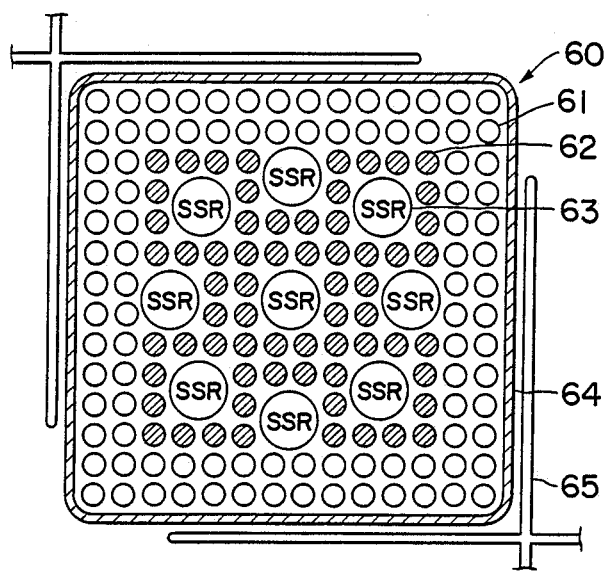

FIG. 17 is a cross sectional view of the thirteenth embodiment according to this invention.

The fuel assembly 60 of this embodiment comprises ordinary full-length fuel rods 61, fuel rods 62 with interposed members, spectral shift rod (SSR) 63, a channel box 64, and cruciform control blades 65.

As a future BWR core, an arrangement of the control blades as shown (K-lattice) in which a large sized fuel bundle is utilized has been studied. In this embodiment, nine water rods of K-lattice each having a size corresponding to four fuel rods are used, and according to this arrangement, in the case where the water rods are used as void tubes during the first half operation period and used as they are during the latter half operation period, the production of the plutonium is improved and the fuel economy is also improved. These water rods with spectral shift operation as an object are called spectral shift rods (SSR). The centrally arranged SSR is completely surrounded and the other SSRs are also surrounded thereby by more than half portions thereof, thus attaining the remarkable shut-down mergin.

FIGS. 18A to 18D are elevational sections of fuel rods of different type according to this invention.

Figures 18A, 18B, 18C, 18D:
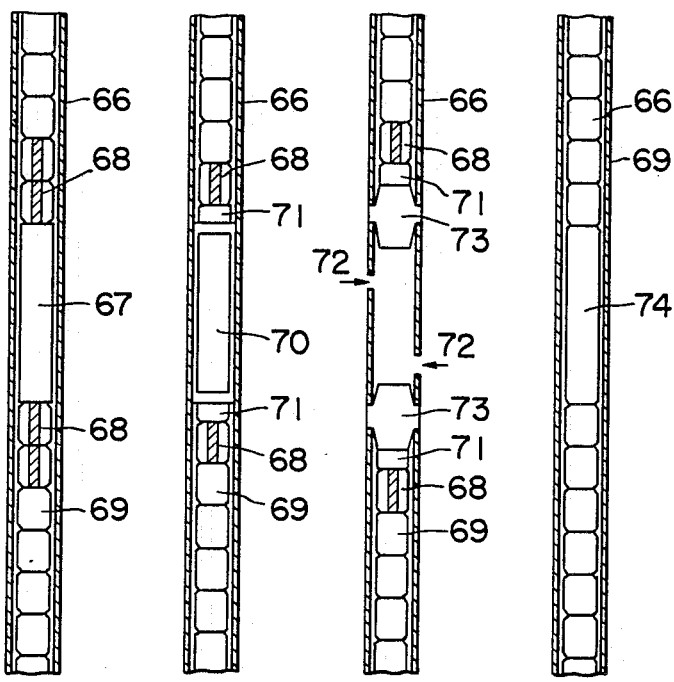
FIGS. 18A to 18D are elevational sections of fuel rods according to this invention.

The fuel rod shown in FIG. 18A includes a zone or area with no occupied fuel material in a clad 66, the zone having an axial length of about 15 to 90 cm and being filled with graphite 67, which has superior high temperature characteristics, absorbs less thermal neutrons, and has a function as a moderator, thus being one most suitable example as an interposed member for the fuel rod. A substance such as $Al_2O_3$ or $ZrO_2$ with low density (porous substance) is not superior in moderating characteristics, but superior in heat-proof characteristics and less thermal neutron absorption characteristics. A hollow graphite, hollow $Al_2O_3$, hollow $ZrO_2$, hollow or solid natural uranium or depleted uranium may be utilized in substitution for the solid graphite, and in such case, the hollow portion may be utilized as a gas plenum.

One of the most important characteristics required for this zone is that the thermal neutron absorption rate of this zone be less than those of zones axially adjacent to this zone in the clad during the final operation period of the reactor core. The fuel materials adjacent to the graphite 67 generate power peaks (spikes) with the range of 2 cm (at most 5 cm), which is disadvantageous for the soundness of the fuel, so that two pellets 68 each having an axial length of about 2 cm and including a burnable poison are arranged near the axis of each fuel rod. The burnable poison is not placed in the outer peripheral portions of the pellets 68, so that the output power varies relatively less throughout the operation cycle. The control rod is so designed such that the absorption characteristics of the poison vanishes as the operation approaches the final stage of the cycle and the power generated in these portions is gently increased. The neutron binding effect of the horizontal fuel zone formed axially adjacent to the interposed zone having the low enrichment of the fissile nuclide is reduced, and as a result, the subcriticality of the reactor during the shut-down period can be made large.

The difference between the fuel rods shown in FIG. 18A and FIG. 18B is that a tube 70 made of zircalloy having a small thermal neutron absorption cross section is inserted into the clad instead of the graphite 67, and on this point, various modifications can be considered as follows.

(1) The zircalloy tube is constructed as a non-sealed tube when it is utilized for the gas plenum.

(2) It is desired to seal zirconium hydride (ZrH$_2$) in the tube when it is packed with high density. The tube has a small air gap for the gas plenum for H$_2$ gas slightly emitted from ZrH$_2$.

(3) It is preferable to put Be or BeO, which are toxic to humans, into the tube. Since the Be generates H$_2$ gas in the reaction core with the neutrons, a small gas plenum (gap) for the H$_2$ gas is provided.

Small heat insulating pellets 71 and $Al_2O_3$, $ZrO_2$ or depleted uranium are interposed between the zircalloy tube 70 and the fuel pellets 69 for improving the soundness of the fuel. It is desirable for the heat insulating pellets 71 that the thermal neutron absorption characteristics be made small at the final stage of the operation cycle, and accordingly, $Al_2O_3$—$Gd_2O_3$, depleted uranium $UO_2$—$Gd_2O_3$, or the like pellet including added burnable poison is deemed to be preferable. With the fuel pellets axially adjacent to the zircalloy tube, it is preferable to arrange the pellets 68 in which the burnable poison is inserted by the length about 2 cm (at most 5 cm) from the ends thereof. Although in FIG. 18B, the fuel pellet 68 into which a Gd pellet having a small diameter is inserted is shown, the Gd may be blended entirely with the pellet, which will be applicable to the fuel rods shown in FIGS. 18A and 18C.

The difference between the fuel rods shown in FIGS. 18B and 18C is that the latter has a construction in which water can be introduced. That is, with the fuel rod of FIG. 18C, a zircalloy tube of the fuel rod of FIG. 18B is provided with upper and lower water pass holes 72 at portions of the clad, and intermediate plugs 73 and heat insulating pellets 71 are disposed respectively at upper and lower portions of the respective water pass holes 72. Pellets 68 including burnable poison are further disposed at upper and lower portions of the heat insulating pellets 71, and fuel pellets 69 are further disposed axially outward the pellets 68.

The difference between the fuel rods shown in FIGS. 18A and 18D is that the latter fuel rod is provided with an interposed zone 74 in which the burnable poison is disposed in addition to the graphite (or $Al_2O_3$, $ZrO_2$ or $Al_2O_3$—$ZrO_2$). According to this embodiment, since the burnable poison is not added in the fuel material, the manufacture of the fuel rod is facilitated.

Figure 19:
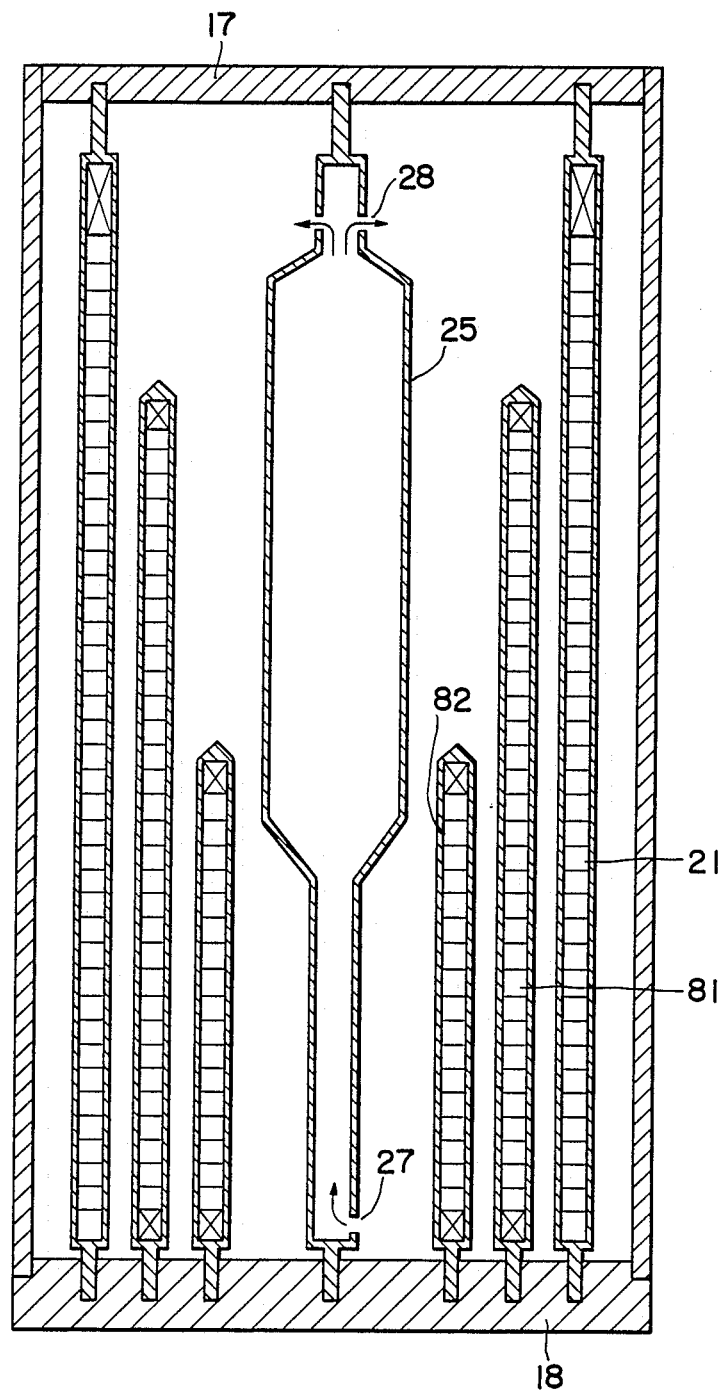
FIG. 19 is a vertical section of the fourteenth embodiment according to this invention.

FIG. 19 is a cross sectional view of the fourteenth embodiment according to this invention. The fuel assembly of this embodiment includes full-length fuel rods 21 each having an axial length substantially equal to the entire axial length of the fuel asssembly, first short fuel rods 81 each having a length shorter than that of the full-length fuel rod 21, and second short fuel rods 82 each having a length further shorter than the length of the first short fuel rod 81. These fuel rods 21, 81 and 82 are arranged so as to surround a large water rod 25 arranged at the central portion of the fuel assembly, and the lower ends of these fuel rods are secured by the lower tie-plate 18.

According to the arrangement of the fuel rods and the water rod, the coolant flow area at the upper portion of the fuel assembly is made larger than that at the lower portion thereof, so that the pressure loss of the coolant can be significantly reduced.

Figure 20A:
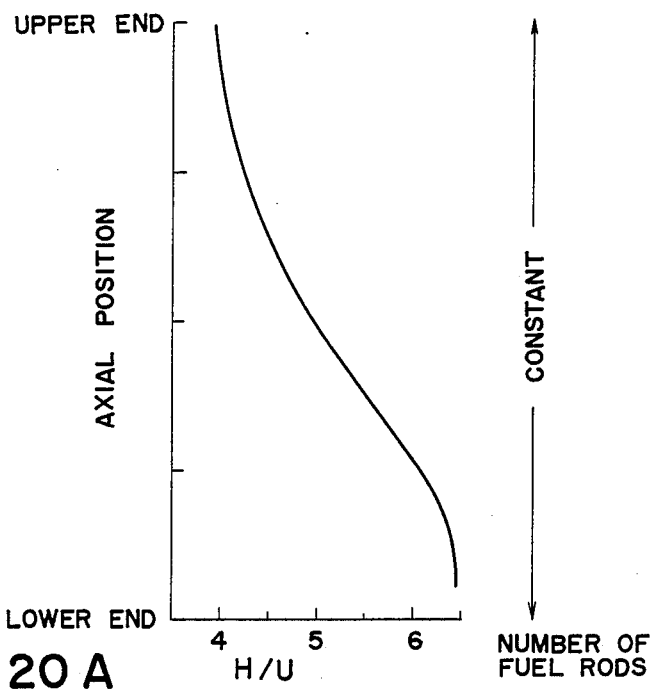
FIGS. 20A and 20B are graphs showing the effects attained by the embodiment shown in FIG. 19.
Figure 20B:
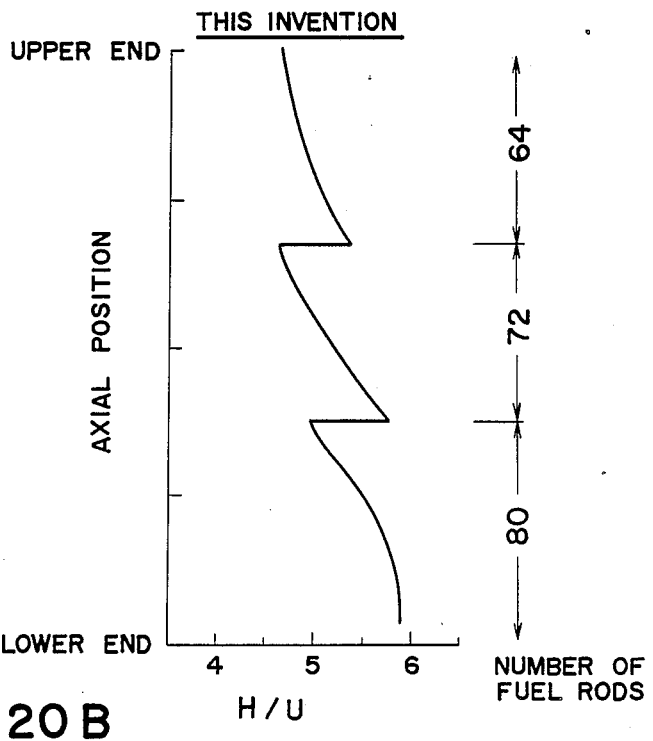

FIG. 20 shows graphs representing the axial distribution of the ratio (H/U) of the number of hydrogen atoms with respect to the number of uranium atoms for a comparison of this embodiment with a conventional example With the conventional example in which the number of the fuel rods is constant and the outer diameter of the water rod is also constant throughout the entire axial length thereof, the H/U distribution (FIG. 20A) ranges between about 4.0 to 7.0. On the other hand, with the embodiment according to this invention in which the number of the fuel rods is gradually reduced towards the upper portion of the fuel assembly, and the outer diameter of the water rod is increased at the upper portion thereof, the H/U distribution (FIG. 20B) ranges between 4.5 to 6.0, thus being made flat in comparison with the conventional example and making large the average infinite multiplication factor of the reactor core.

Figure 21:
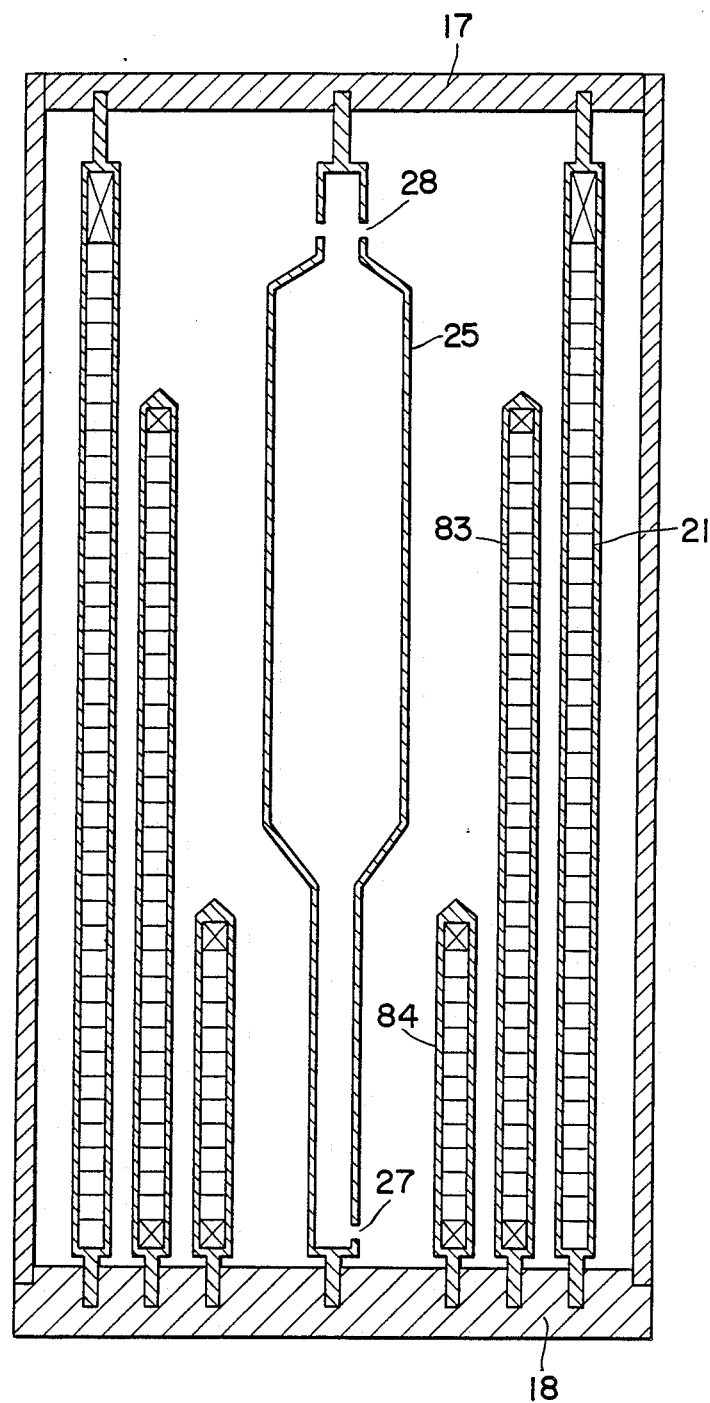
FIGS. 21 and 22 are sectional views of the fifteenth and sixteenth embodiments according to this invention.

FIG. 21 is a vertical sectional view of the fifteenth embodiment according to this invention, which is an improvement of the embodiment shown in FIG. 19. The fuel assembly of this embodiment is divided into axially upper, central and lower parts having axial lengths substantially equal to each other. The first short fuel rods 83 each having an axial length shorter than that of the full-length full rod 21 are arranged so as to extend over the central and lower portions of the fuel assembly, and the second short fuel rods 84 are arranged in the lower portion thereof.

Figure 22:
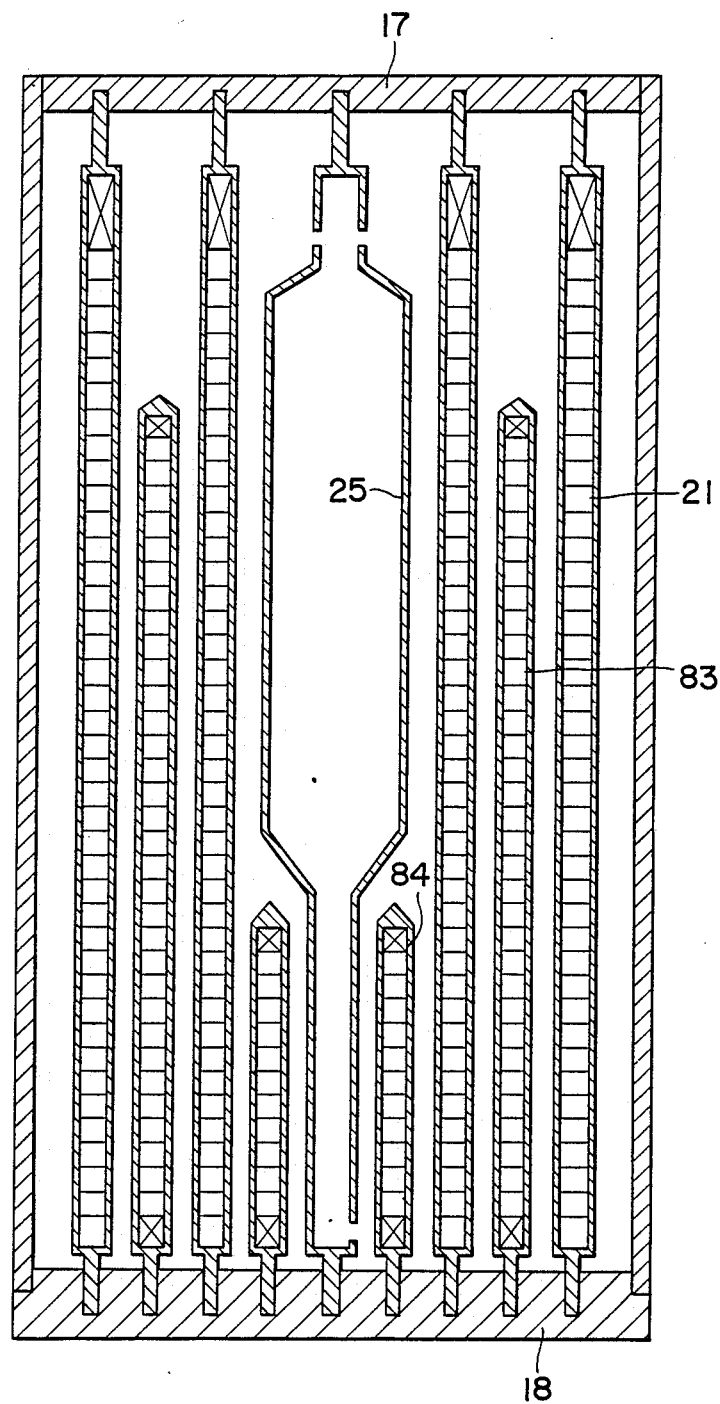
Figure 23A:
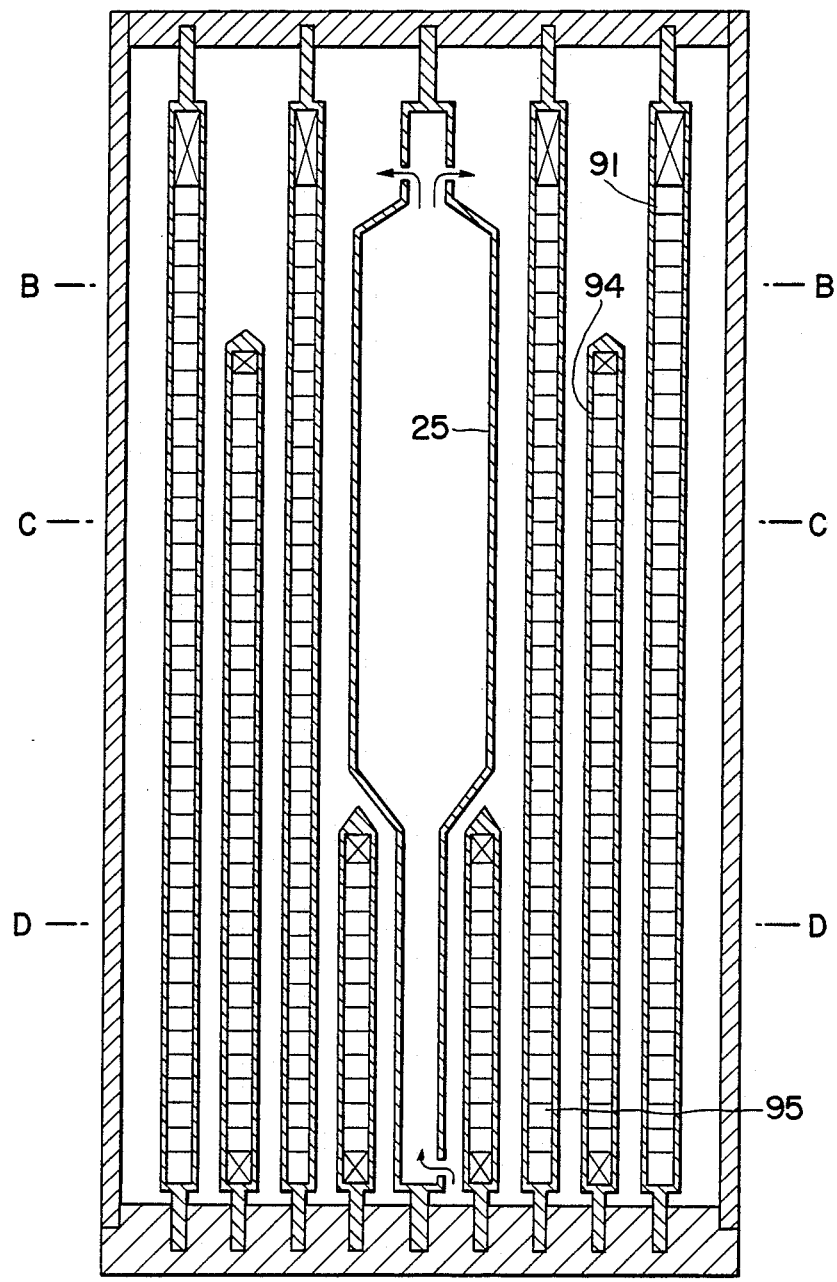
Figure 24:
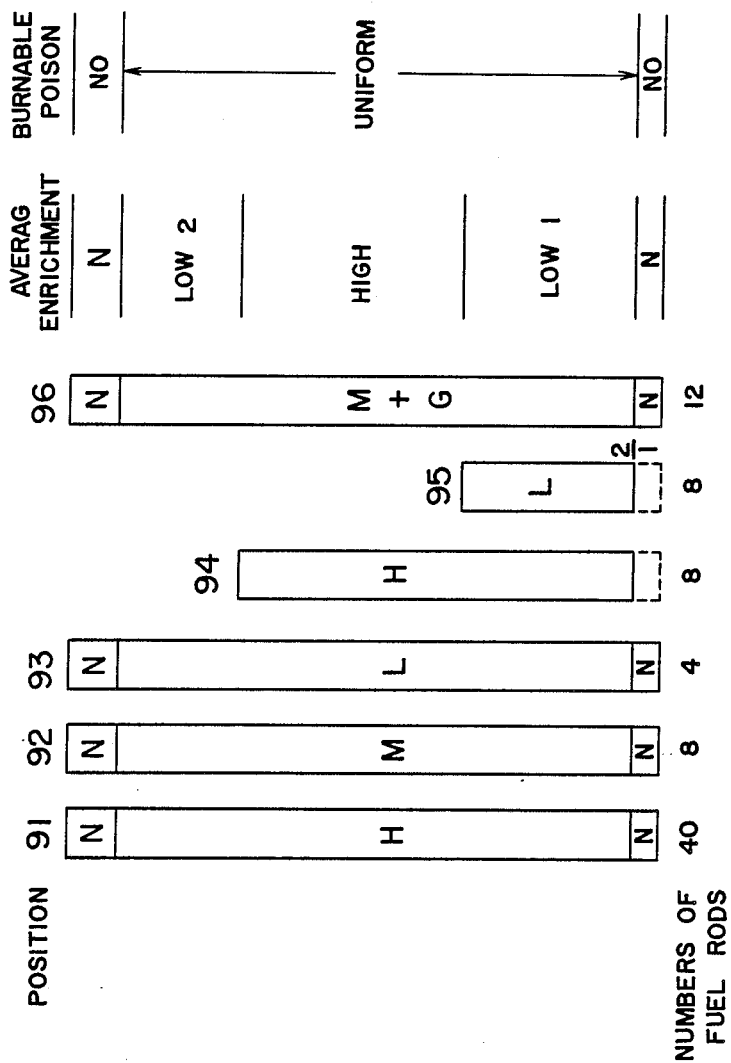
FIG. 24 is an illustration of fuel rods to be used for the fuel assembly shown in FIG. 23.
Figure 25:
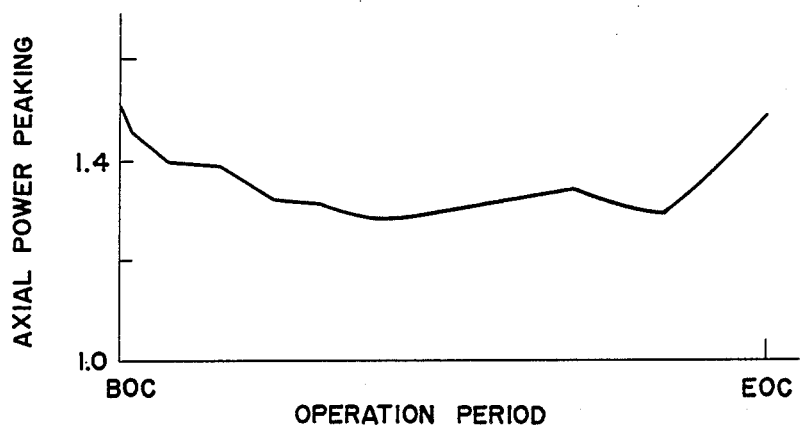
FIG. 25 is a graph representing a relationship between the reactor operation period and the axial power peaking.
Figure 26:
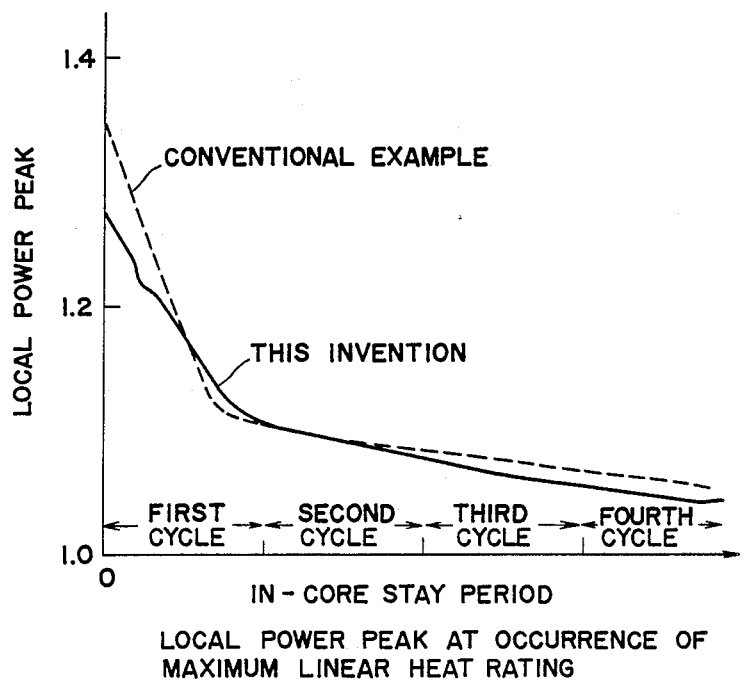
FIG. 26 is a graph representing the local power peaking at an occurrence of the maximum line power density.
Figure 27:
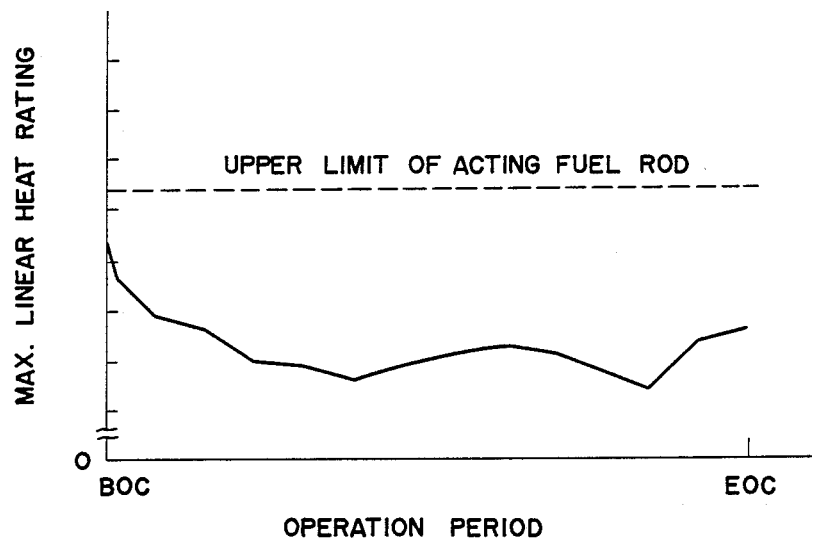
FIG. 27 is a graph representing a relationship between the reactor operation period and the maximum line power density.
Figure 28:
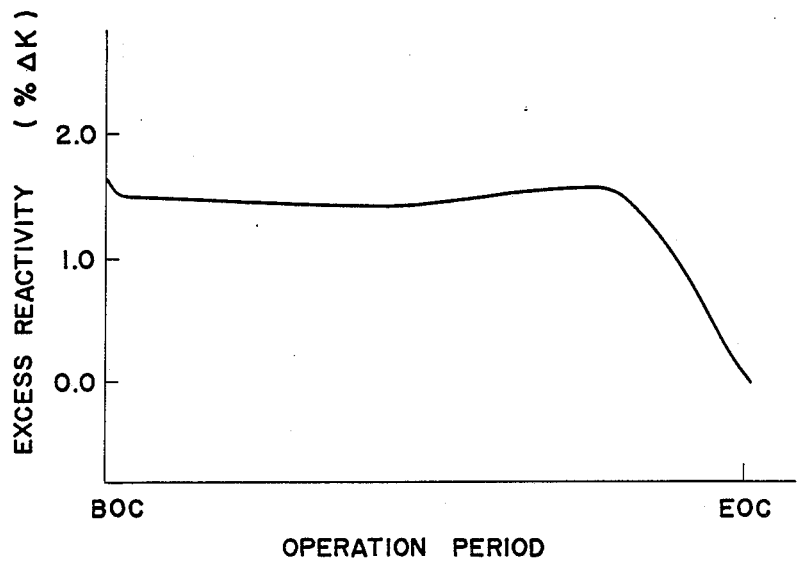
FIG. 28 is a graph representing a relationship between the reactor operation period and the excess reactivity.
Figure 29A:
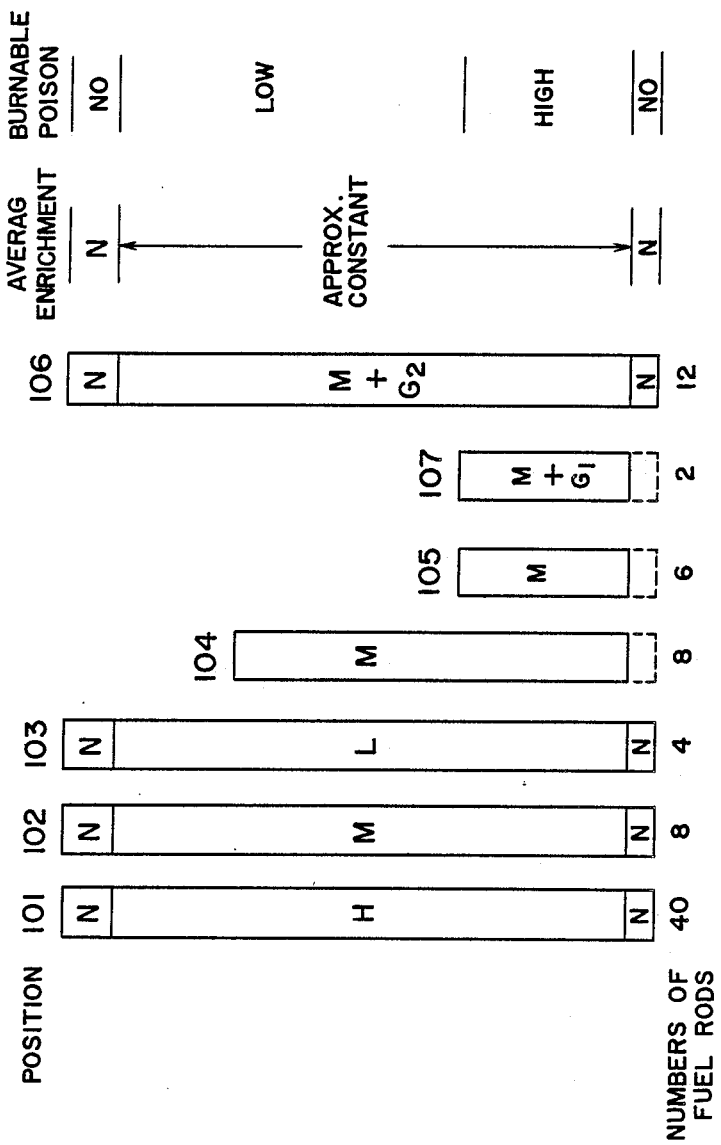
Figure 30A:
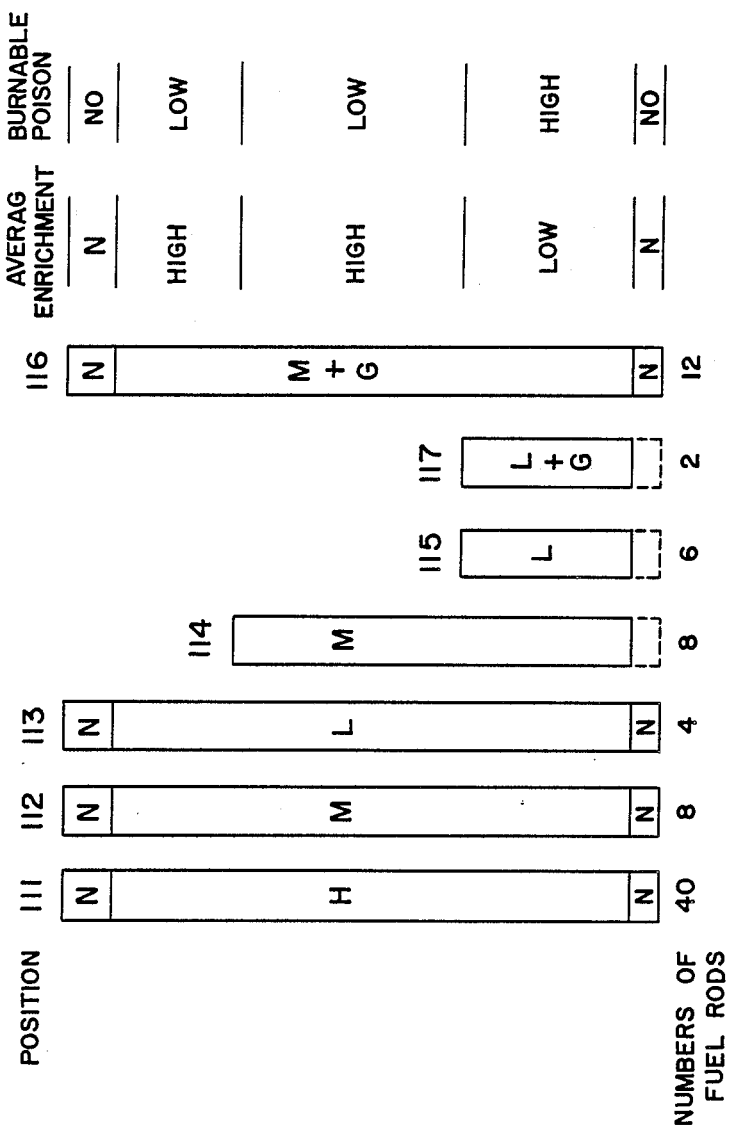
Figures 30B, 30C, 30D:
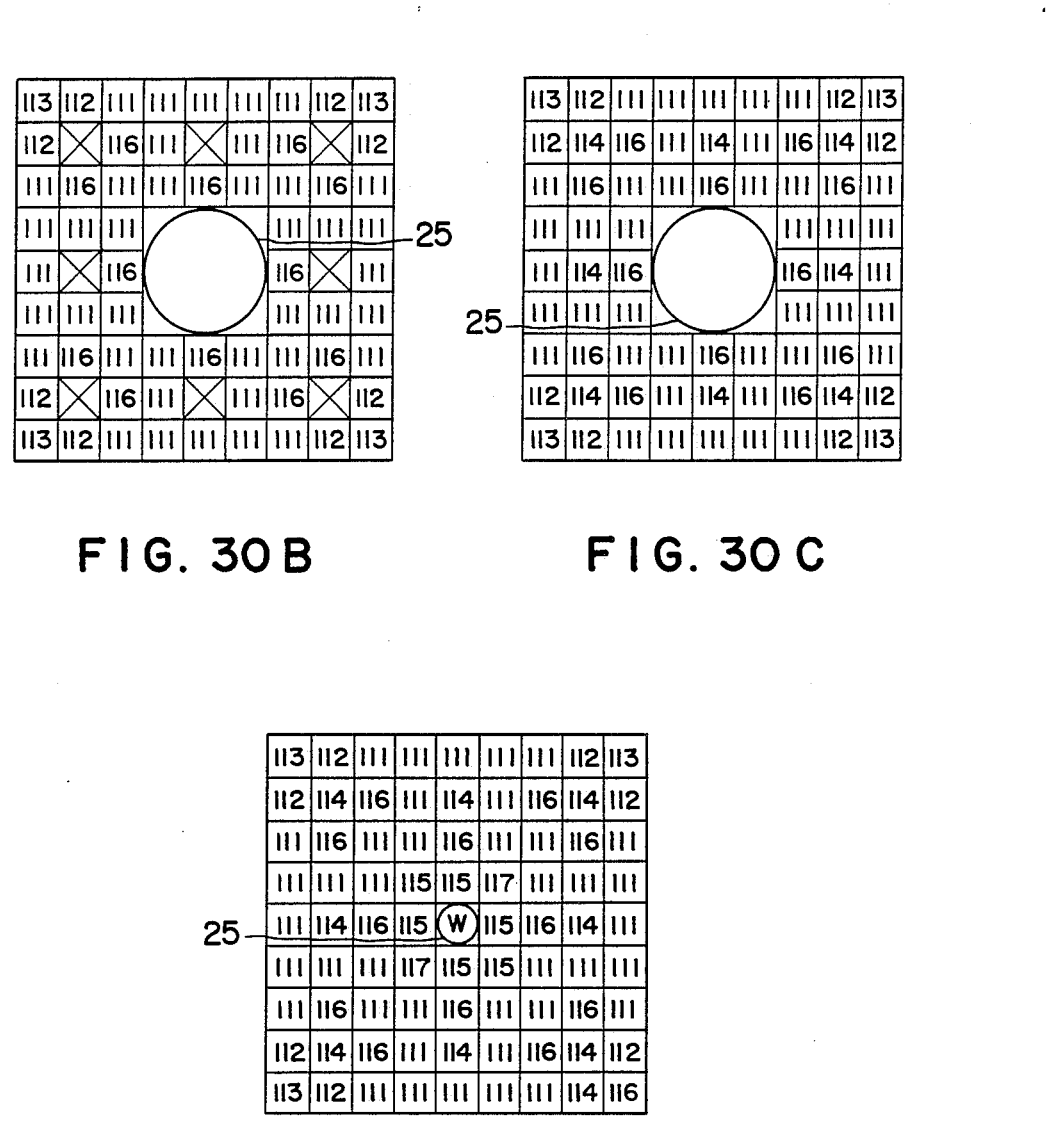

FIG. 22 is a vertical sectional view of the sixteenth embodiment according to this invention, which is an application of the fifteenth embodiment. The fuel assembly of this embodiment includes the fuel rods in 9×9 (nine rows and nine lines) arrangement and includes at these portions corresponding to that of the natural uranium. The other portions of the fuel rods 111, 112 and 113 have uniform enrichment H, M and L, respectively which are reduced in this order. The enrichment M substantially corresponds to the average enrichment of the fuel assembly. As shown in FIGS. 30B to 30D, the full-length fuel rods 113 are arranged at the four corner portions of the fuel assembly and the eight full-length fuel rods 112 are arranged at the peripheral portions thereof adjacent to the full-length fuel rods 113.

The enrichment of each of the first short fuel rods 114 corresponds to the intermediate enrichment M being substantially the average enrichment of the fuel assembly, and the enrichment of each of the second short fuel rods 115 corresponds to the lowest enrichment L. The burnable poison is included in portions of the full-length fuel rods 116 and the first short fuel rods 117 with substantially equal densities.

The fuel assembly of this invention includes forty full-length fuel rods 111, eight full-length fuel rods 112, four full-length fuel rods 113, eight first short fuel rods 114, four second short fuel rods 115, twelve fuel rods 116 with the burnable poison, and two short fuel rods 117 with the burnable poison.

According to this embodiment, the distribution of the enrichment of the seventeenth embodiment is divided into two portions and the distribution of the burnable poison is further added thereto, thus obtaining substantially the same characteristics features as those attained by the former seventeenth and eighteenth embodiments.

It should be understood that, in the respective embodiments described hereinbefore, the fuel assemblies including 9×9 (nine lines and nine rows) arrangements of the fuel rods have been described, but, according to this invention, these embodiments can be adopted also for the fuel assemblies in which a plurality of sub-bundles, each comprising a plurality of fuel rods, are combined.

What is claimed is:

1. A fuel assembly for a nuclear reactor of the type in which a number of fuel rods, each constructed by filling a clad with a fuel material, are systematically arranged, comprising;
    a water rod provided with an upper portion having a cross sectional area larger than that of each of the fuel rods and a lower portion having a cross sectional area smaller than that of the upper portion;
    first fuel rods each having a whole effective enriched fuel zone filled with a fuel material throughout an entire axial length of the clad of the fuel rod; and
    at least one second fuel rod having a partial effective enriched fuel zone filled with a fuel material and having an interposed zone in which enrichment of a fissile nuclide in the clad of the fuel rod is equal to or less than that of natural uranium, or the fissile nuclide does not exist at all, said second fuel rod being so disposed as to surround said water rod and said interposed zone being positioned on an axial level including a portion at which the local subcriticality is made small relative to the subcriticality distributed over the entire axial length of the clad of said first fuel rod at a period in which maintenance of reactor shut-down margin is made difficult during a reactor operation period;
    wherein the lower portion of said water rod is positioned on an axial level corresponding to a lower portion of said effective enriched fuel zone.

2. The fuel assembly according to claim 1 wherein said interposed zone has an axial length longer than the thermal neutron diffusion length during a reactor cold operation period and less than one-third length of an axial exothermic portion of the fuel assembly.

3. The fuel assembly according to claim 1 wherein said first fuel rods include full-length fuel rods each having an axial length substantially equal to that of the fuel assembly and at least one kind of short fuel rods each having a length shorter than that of the full-length fuel rod, said short fuel rods being so arranged as to surround the outer periphery of the lower portion of said water rod.

4. The fuel assembly according to claim 1 wherein said interposed zone is occupied by a solid moderator.

5. The fuel assembly according to claim 1 wherein said interposed zone is occupied by a liquid moderator.

6. The fuel assembly according to claim 1 wherein said interposed zone is occupied by a depleted uranium.

7. The fuel assembly according to claim 1 wherein said interposed zone is occupied by natural uranium.

8. The fuel assembly according to claim 1 wherein said interposed zone is additionally filled with a burnable poison having a density of a degree such that it will vanish at the final stage of a reactor operation period.

9. The fuel assembly according to claim 1 wherein a burnable poison is contained in the fuel material in fuel zones axially adjacent to said interposed zone to an extent such that it will vanish at the final stage of a reactor operation period.

10. A fuel assembly for a nuclear reactor of the type in which a number of fuel rods, each constructed by filling a clad with a fuel material, are systematically arranged comprising:
    a water rod provided with an upper portion having a cross sectional area larger than that of each of the fuel rods and a lower portion having a cross sectional area smaller than that of said upper portion of the water rod;

full-length fuel rods each having an axial length substantially equal to the axial length of the fuel assembly; and at least two kinds of short fuel rods each having a length shorter than that of said full-length fuel rods;

wherein the lower portion of said water rod is positioned on an axial level corresponding to a lower portion of said full-length fuel rods.

11. The fuel assembly according to claim 10 wherein the fuel assembly is axially sectioned into upper, central and lower portions each having substantially equal axial length and wherein outer diameters of portions of said water rod positioned in the upper and central portions of the fuel assembly are made larger than an outer diameter of a portion of said water rod positioned in the lower portion of the fuel assembly.

12. The fuel assembly according to claim 11 wherein said short fuel rods include first short fuel rods disposed at the central and lower portions of the fuel assembly and second short fuel rods each having an axial length shorter than that of each of said first short fuel rods and disposed at the lower portion of the fuel assembly.

13. The fuel assembly according to claim 11 wherein the fuel assembly includes fuel rods arranged in nine rows and nine lines and a water rod provided with a portions having a diameter approximately three times the rod pitch of the fuel rods and with a portion having a diameter substantially equal to the outer diameter of the fuel rod.

14. The fuel assembly according to claim 10 wherein said short fuel rods include first short fuel roads each having an axial length longer than that of the portion of the water rod having a small cross sectional area and second short fuel rods each having an axial length equal to or shorter than that of the portion of the water road having a small cross sectional area, and wherein said first short fuel rods are provided with fissionable material having an enrichment substantially equal to or greater than an average enrichment of the fissionable material in the fuel assembly, and said second short fuel rods are provided with fissionable material having an enrichment substantially equal to or less than the average enrichment of the fissionable material in the fuel assembly.

15. The fuel assembly according to claim 1 wherein said interposed zone is positioned from the upper end of the effective enriched fuel zone at a distance of about 1/6 to ¼ of the entire length of the whole effective enriched fuel zone.

16. The fuel assembly according to claim 1 wherein said interposed zone is positioned on an axial level corresponding to said upper portion of said water rod.

* * * * *